(12) United States Patent
Stafford

(10) Patent No.: US 9,630,105 B2
(45) Date of Patent: Apr. 25, 2017

(54) CAMERA BASED SAFETY MECHANISMS FOR USERS OF HEAD MOUNTED DISPLAYS

(71) Applicant: Sony Interactive Entertainment Inc., Tokyo OT (JP)

(72) Inventor: Jeffrey Roger Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 191 days.

(21) Appl. No.: 14/333,500

(22) Filed: Jul. 16, 2014

(65) Prior Publication Data
US 2015/0094142 A1 Apr. 2, 2015

Related U.S. Application Data

(63) Continuation-in-part of application No. 14/170,470, filed on Jan. 31, 2014.
(Continued)

(51) Int. Cl.
*A63F 9/24* (2006.01)
*A63F 13/537* (2014.01)
(Continued)

(52) U.S. Cl.
CPC .......... *A63F 13/537* (2014.09); *A63F 13/211* (2014.09); *A63F 13/212* (2014.09);
(Continued)

(58) Field of Classification Search
None
See application file for complete search history.

(56) References Cited

U.S. PATENT DOCUMENTS

| 7,677,734 | B2 * | 3/2010 | Wallace | A61B 5/055 345/8 |
| 2001/0040590 | A1 * | 11/2001 | Abbott | G06F 1/163 715/700 |

(Continued)

FOREIGN PATENT DOCUMENTS

| WO | WO 2012101720 A1 | 8/2012 |
| WO | WO 2013052855 A2 | 4/2013 |

OTHER PUBLICATIONS

Cirio et al., "Walking in a Cube: Novel Metaphors for Safely Navigating Large Virtual Environments in Restricted Real Workspaces", IEEE Transations on Visualization and Computer Graphics, IEEE Service Center, Los Alamitos, CA, vol. 18, No. 4, Apr. 1, 2012, pp. 546-554, XP011490408, ISSN: 1077-2626, DOI: 10.1109/TVCG.2012.60.
(Continued)

*Primary Examiner* — Paul A D'Agostino
(74) *Attorney, Agent, or Firm* — Martine Penilla Group, LLP

(57) ABSTRACT

The disclosure provides methods and systems for warning a user of a head mounted display during gameplay of a video game. A game is executed causing interactive scenes of the game to be rendered on a display portion of a head mounted display (HMD) worn by a user. A change in position of the HMD worn by the user, while the user is interacting with the game, is detected. The change in position is evaluated, the evaluation causing a signal to be generated when the change exceeds a pre-defined threshold value. When the signal is generated, content is sent to interrupt the interactive scenes being rendered on the display portion of the HMD. The data sent provides descriptive context for the signal.

8 Claims, 19 Drawing Sheets

Related U.S. Application Data

(60) Provisional application No. 61/884,900, filed on Sep. 30, 2013.

(51) Int. Cl.

| | | |
|---|---|---|
| *A63F 13/212* | (2014.01) | |
| *A63F 13/25* | (2014.01) | |
| *G02B 27/01* | (2006.01) | |
| *A63F 13/49* | (2014.01) | |
| *A63F 13/213* | (2014.01) | |
| *A63F 13/5255* | (2014.01) | |
| *A63F 13/533* | (2014.01) | |
| *G06F 3/01* | (2006.01) | |
| *G06F 3/03* | (2006.01) | |
| *G06F 3/0481* | (2013.01) | |
| *A63F 13/211* | (2014.01) | |
| *A63F 13/26* | (2014.01) | |

(52) U.S. Cl.
CPC ............ *A63F 13/213* (2014.09); *A63F 13/25* (2014.09); *A63F 13/26* (2014.09); *A63F 13/49* (2014.09); *A63F 13/5255* (2014.09); *A63F 13/533* (2014.09); *G02B 27/017* (2013.01); *G06F 3/011* (2013.01); *G06F 3/012* (2013.01); *G06F 3/017* (2013.01); *G06F 3/0304* (2013.01); *G06F 3/04815* (2013.01); *A63F 2300/538* (2013.01)

(56) References Cited

U.S. PATENT DOCUMENTS

| | | | | |
|---|---|---|---|---|
| 2005/0168569 A1* | 8/2005 | Igarashi | ................... | A61F 9/08 348/62 |
| 2005/0195277 A1* | 9/2005 | Yamasaki | ............ | G02B 27/017 348/61 |
| 2007/0297687 A1* | 12/2007 | Yamasaki | ............ | G02B 27/017 382/255 |
| 2008/0051946 A1* | 2/2008 | Breed | ..................... | B60C 11/24 701/1 |
| 2008/0278821 A1* | 11/2008 | Rieger | ................. | G02B 27/017 359/630 |
| 2011/0214082 A1* | 9/2011 | Osterhout | ............ | G02B 27/017 715/773 |
| 2011/0230263 A1 | 9/2011 | Ng | | |
| 2012/0154557 A1* | 6/2012 | Perez | ............... | H04N 21/25891 348/53 |
| 2012/0194554 A1* | 8/2012 | Kaino | ............. | G08B 13/19621 345/633 |
| 2012/0206485 A1* | 8/2012 | Osterhout | .......... | G02B 27/0093 345/633 |
| 2012/0212414 A1* | 8/2012 | Osterhout | ............ | G02B 27/017 345/158 |
| 2012/0235900 A1* | 9/2012 | Border | ..................... | G02B 5/23 345/156 |
| 2013/0021373 A1* | 1/2013 | Vaught | ................. | G02B 27/017 345/633 |
| 2013/0093788 A1* | 4/2013 | Liu | .......................... | G06F 3/011 345/633 |
| 2013/0095924 A1* | 4/2013 | Geisner | ................... | A63F 13/00 463/32 |
| 2013/0127980 A1* | 5/2013 | Haddick | ................. | G06F 3/013 348/14.08 |
| 2013/0278631 A1* | 10/2013 | Border | ................. | G02B 27/017 345/633 |
| 2013/0293586 A1* | 11/2013 | Kaino | .................... | G08G 1/005 345/633 |
| 2013/0314303 A1* | 11/2013 | Osterhout | ............... | G06F 3/005 345/8 |
| 2014/0142757 A1* | 5/2014 | Ziegler | .................... | B25J 5/007 700/255 |
| 2014/0192084 A1* | 7/2014 | Latta | ...................... | G06F 21/10 345/633 |
| 2015/0205484 A1* | 7/2015 | Morishita | ............... | G06F 3/012 382/103 |
| 2015/0248826 A1* | 9/2015 | Hahn | .................. | G05B 19/409 340/539.11 |

OTHER PUBLICATIONS

Partial International Search Report, PCT/US2014/055715, pp. 1-2, Jul. 1992; reprint Jan. 2004.

Partial International Search Report, PCT/US2014/057041, pp. 1-5, Feb. 10, 2015.

Steinicke et al., "Estimation of Detection Thresholds for Redirected Walking Techniques", IEEE Transactions on Visualization and Computer Graphics, IEEE Service Center, Los Alamitos, CA, vol. 16, No. 1, pp. 17-27.

Turchet et al., "Inside the Boundaries of the Physical World: Audio-Haptic Feedback as Support for the Navigation in Virtual Environments", Jun. 13, 2012, Haptics: Perception, Devices, Mobility, and Communication, Springer Berlin Heidelberg, Berlin, pp. 577-588, XP047010369, ISBN: 978-3-642-31400-1.

Williams et al., "Exploring Large Virtual Environments with an HMD when Physical Space is Limited", XP-001510324, Symp. on Applied Perception in Graphics and Visualization, ACM, NY, pp. 41-48, Proc. Jul. 25, 2007.

* cited by examiner

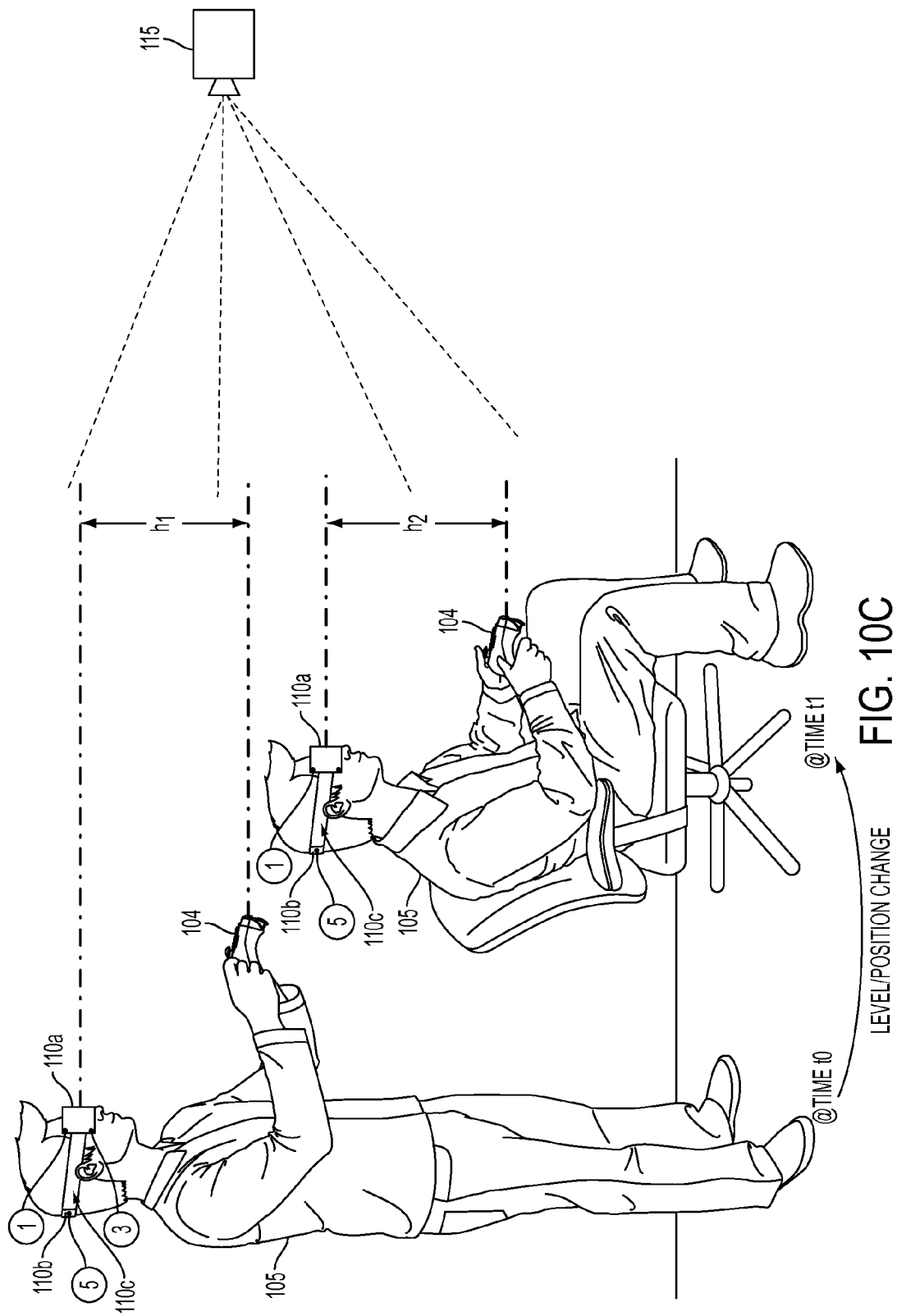

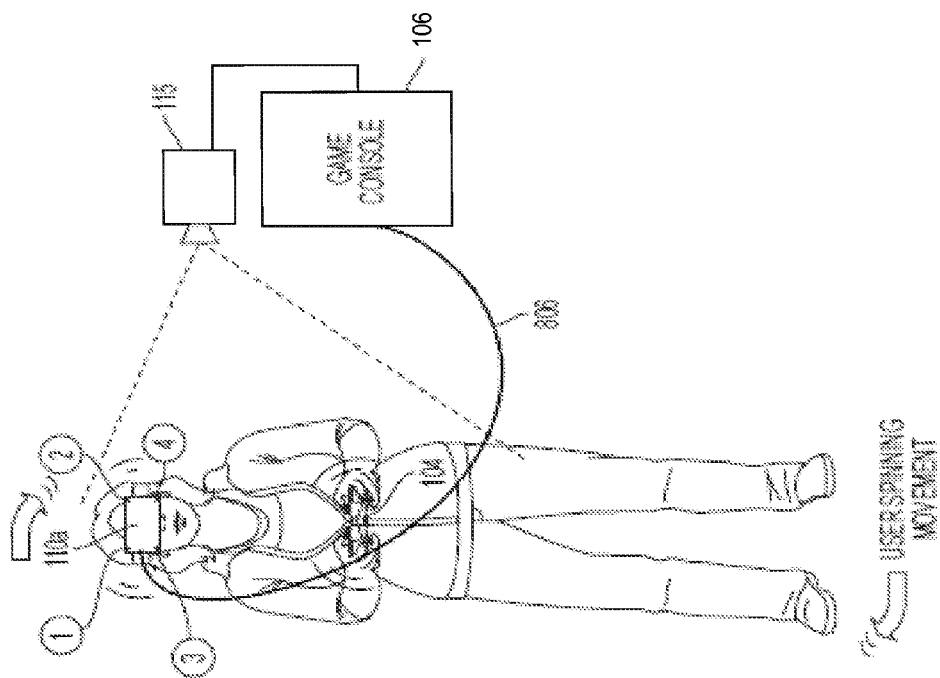
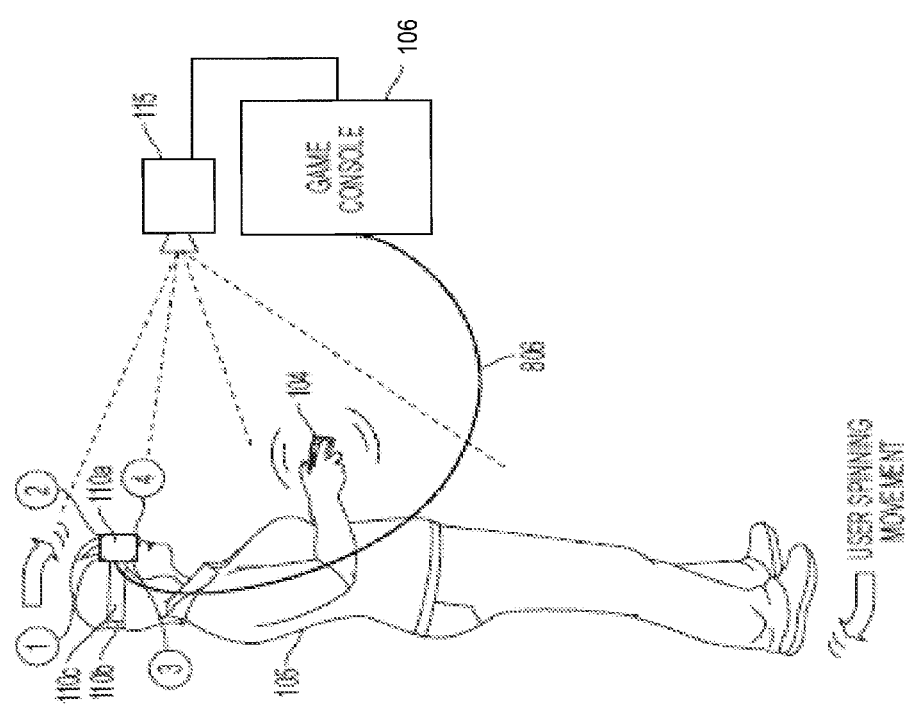
FIG. 11A
FIG. 11B

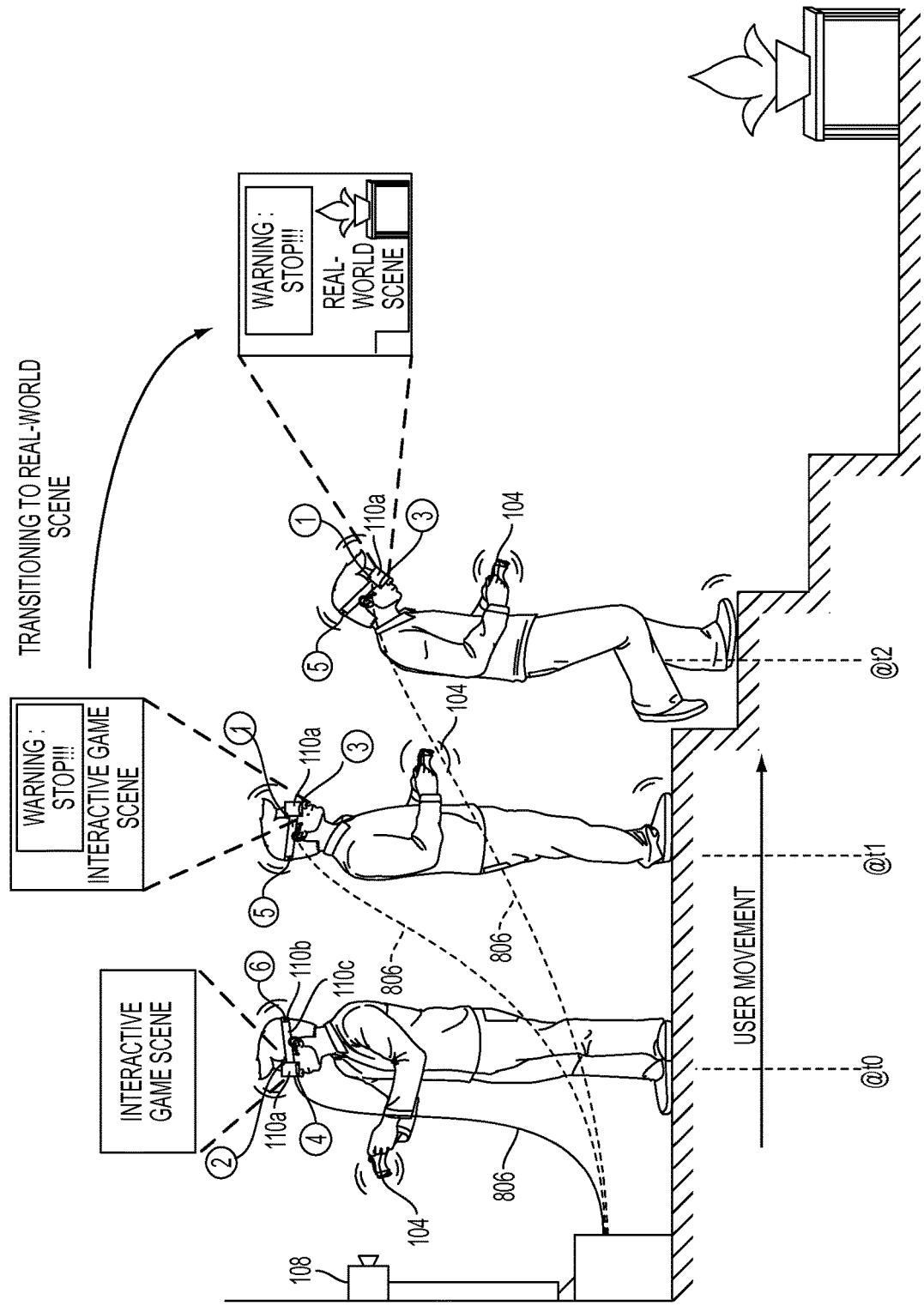

CAMERA BASED SAFETY MECHANISMS FOR USERS OF HEAD MOUNTED DISPLAYS

CLAIM OF PRIORITY

This application is a continuation-in-part of U.S. application Ser. No. 14/170,470, filed Jan. 31, 2014, and titled, "Camera Based Safety Mechanisms for Users of Head Mounted Displays," which claims the priority benefit under 35 USC §119(e), to U.S. provisional application No. 61/884,900, filed Sep. 30, 2013, and titled "Camera Based Safety Mechanisms for Users of Head Mounted Displays." The above-referenced applications are hereby incorporated by reference in their entirety.

TECHNICAL FIELD

This disclosure relates generally to human-computer interfaces, more particularly, to warning users when they move outside of a camera's field of view or when they approach one or more tangible obstacles.

DESCRIPTION OF RELATED ART

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

One of the rapidly growing technologies in the field of human-computer interaction is various head-mounted or head-coupled displays, which can be worn on a user head and which have one or two displays in front of the one or two user eyes. This type of displays has multiple civilian and commercial applications involving simulation of virtual reality including video games, medicine, sport training, entertainment applications, and so forth. In the gaming field, these displays can be used, for example, to render three-dimensional (3D) virtual game worlds. The important aspect of these displays is that the user is able to change a displayable view within the virtual world by turning his head in addition to utilizing a traditional input device such as a keyboard or a trackball.

However, in traditional head-mounted displays, the users are vulnerable to get injuries when they wear the head mounted display and provide user actions, such as making motions or move towards tangible obstacles such as a coffee table, chair, etc. In addition, in some human-computer interfaces involving head-mounted displays, the user shall be present within the field of view of a dedicated video camera or depth sensor. It may be annoying for the user when the human-computer interaction is interrupted if the user moves out of the field of view.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure refers to the technology for warning the users of head mounted displays (HMDs) that they approach an edge of a scene defined by field of view of a camera or that they approach one or more tangible obstacles. The warning includes presenting audio and/or displayable messages to the user, or moving the display(s) of the head mounted displays away from the user's eyes. In addition to providing warning, the present disclosures may be used to adjust content that is being rendered on a display portion of the HMD based on the actions, such as moving toward edge of field view, moving toward a tangible obstacle, etc., by the users wearing the HMD. In some embodiments, adjusting the content includes rendering real-world object from the immediate vicinity of the user on a display portion of the HMD. The determination that the user approaches the edge of scene or a tangible obstacle is made by dynamically tracking motions of the users through analysis of images and/or depth data obtained from image sensor(s) and/or depth sensor(s) secured to either the head mounted display, arranged within or outside of the scene and not secured to the head mounted display, or a combination of both.

The edge of the scene may include a tangible obstacle. The images further include depth information of the scene. The scene can be defined by a field of view of at least one image sensor or at least one depth sensor. The warning includes directing, by the processor, the user back towards a center of the scene.

In certain embodiments, the method further includes receiving, by the processor, secondary images of the scene from one or more secondary sensors arranged outside of the scene and not secured to the head mounted display. The determining that the user approaches towards one or more tangible obstacles is further based at least on the secondary images. In certain embodiments, the one or more tangible obstacles are present within the scene. In some embodiments, the one or more tangible obstacles include an edge of the scene.

According to one embodiment, a method is provided. The method includes executing a game. The execution causes interactive game scenes of the game to be rendered on a display portion of a head mounted display worn by a user. A change in position of the HMD worn by the user, is detected, while the user is interacting with the game. The change in position of the HMD is evaluated. A signal is generated when the change exceeds a pre-defined threshold value, based on the evaluation. When the signal is generated, data is sent to interrupt the interactive scenes being rendered on the display portion of the HMD. The data sent to the HMD provides descriptive context for the signal.

In another embodiment, a method is disclosed. The method includes executing a game. The execution causes interactive scenes of the game to be rendered on a display portion of a head mounted display (HMD) worn by a user. A volume surrounding the HMD worn by the user is determined using, for example, using one or more coordinates in Cartesian space. Actions of the user wearing the HMD are monitored during gameplay of the game. When the actions result in a change in the position of the HMD worn by the user, the change is evaluated. The evaluation causes a signal to be generated when the change exceeds a pre-defined threshold value. When the signal is generated, data is sent to interrupt the interactive scenes being rendered on the display portion of the HMD. The data that is sent provides descriptive context for the signal.

In some embodiments, the adjustment to the content includes graduated fading of the brightness of the interactive scenes of the game rendered on the screen of the HMD, transitioning the screen of the HMD to a semi-transparent mode or a transparent mode. The transitioning results in the rendering of real-world object from an immediate vicinity of the user wearing the HMD. Image of the real-world object may be rendered in the foreground while the interactive scenes are rendered in the background, the real-world object may be rendered in the background while the interactive scenes are rendered in the foreground, the real-world object may be rendered in a portion of a display screen of the HMD with the interactive scenes being rendered in the remaining portion of the display screen, or any combinations thereof.

In some embodiments, the adjustment to the content may be in the form of graduated fading of brightness of the interactive scenes of the game rendered on the display portion of the HMD. The fading of the brightness may be stronger as the user gets closer to the edge of the scene or the object.

In certain embodiments, in addition to indicating adjustment to the content, the signal may issue a warning to the user. The warning may be in the form of an audio message, a displayable message for rendering at the display portion of the HMD, or a haptic message, such as a vibration, etc., at the HMD. The warning also includes moving, by the processor, at least one display of the head mounted display away from eyes of the user.

In further embodiments, the method operations are stored on a machine-readable medium comprising instructions, which when implemented by one or more processors perform the operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation in the figures of the accompanying drawings, in which like references indicate similar elements and in which:

FIGS. 10A-10C illustrate exemplary embodiments for determining change in elevation of the head mounted display worn by the user.

FIGS. 11A-11E illustrate tracking of head mounted display to identify a safety issue, in one embodiment of the invention. FIG. 11F illustrates tracking of a head mounted display to identify another safety issue, in an alternate embodiment of the invention.

DETAILED DESCRIPTION

Figure 1:
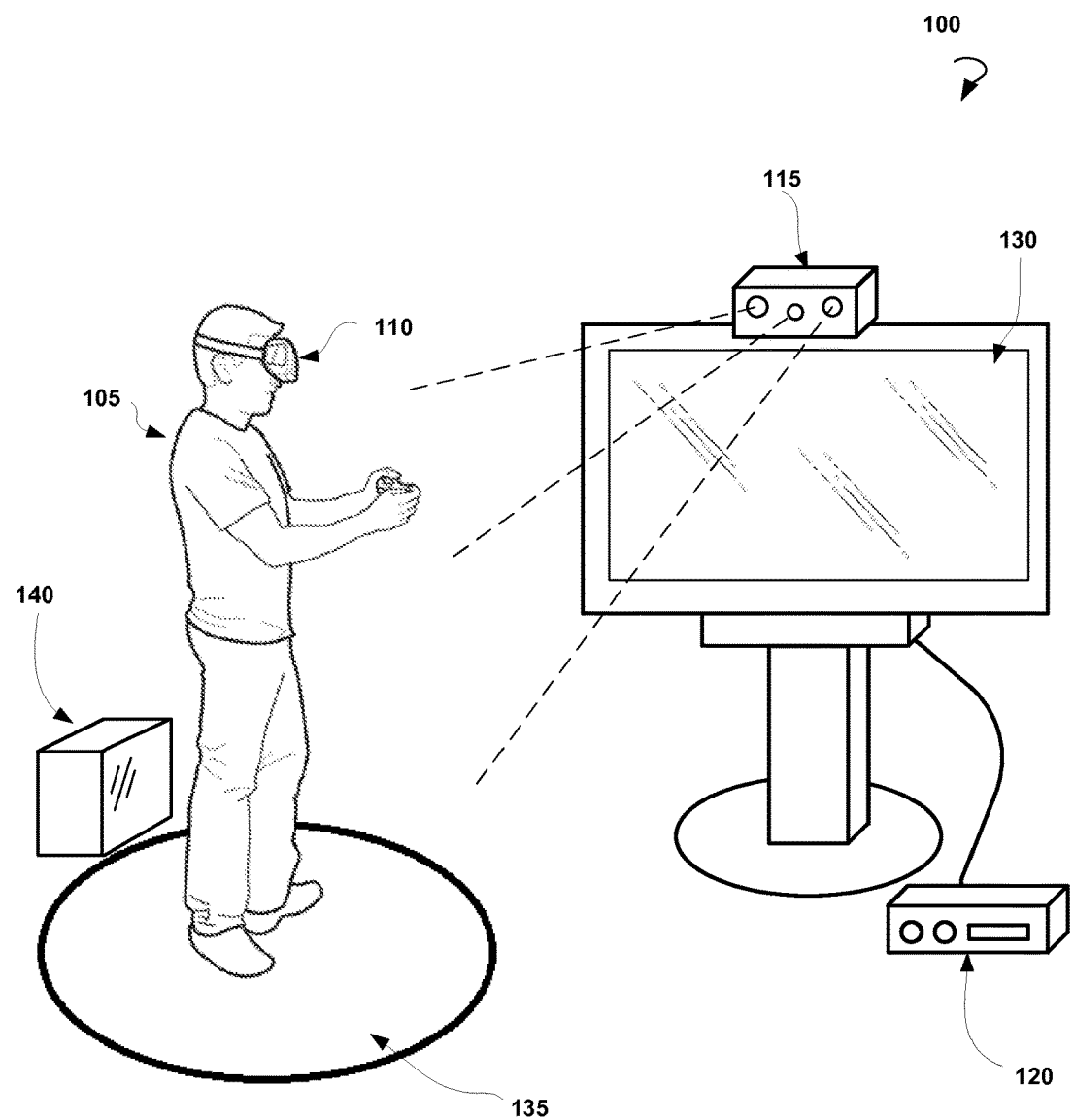
FIG. 1 is an example scene suitable for implementation of various aspects of the present technology, in accordance with an embodiment of the disclosure.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein are implemented in software executing on a computer system or in hardware utilizing either a combination of microprocessors or other specially designed application-specific integrated circuits (ASICs), programmable logic devices, or various combinations thereof. In particular, the methods described herein are implemented by a series of computer-executable instructions residing on a storage medium such as a disk drive, or computer-readable medium. It should be noted that methods disclosed herein can be implemented by a mobile terminal, cellular phone, smart phone, computer (e.g., a desktop computer, tablet computer, laptop computer), game console, handheld gaming device, and so forth.

In general, the embodiments of the present disclosure provides methods and systems for warning users of head mounted displays that approach an edge of a scene or move outside a field of view of a camera, or when they move towards one or more tangible obstacles. The determination that the users approach the field of view edge or the obstacles is made based on analysis of images and/or depth data. The images and/or depth data can be obtained from image sensor(s) and/or depth sensor(s) arranged either on the head mounted display or apart from the user and not being connected to the head mounted display, or a combination of both. The warning includes audio messages, displayable or visible messages, highlighting of LEDs, graduate fading of the displayable images on the head mounted display, fading of the images' brightness, blending in the real world view, causing the head mounted display to vibrate, disengaging the head mounted display or its parts, or moving display(s) of the head mounted display away from the user's eyes so the user could see the real world and obstacles where he moves.

The term "head mounted display," as used herein, refers to one or more of the following: a wearable computer having a display, head mounted electronic device, a head-coupled display, a helmet-mounted display, a head-mounted computer with a display. The head mounted device, which is worn on a head of a user or which is a part of a helmet, has a small display optic in front of one (monocular display device) or each eye (binocular display device). The head mounted device has either one or two small displays with lenses and semi-transparent mirrors embedded in a helmet, eye-glasses (also known as data glasses) or visor. The display units can be miniaturized and may include a Liquid Crystal Display (LCD), Organic Light-Emitting Diode (OLED) display, or the like. Some vendors employ multiple micro-displays to increase total resolution and field of view. Some other head mounted devices do not use a traditional display at all and instead project light directly into the user's eyes.

The term "depth sensor," as used herein, refers to any suitable electronic device capable to generate depth maps of a 3D space. Some examples of the depth sensitive device include a depth sensitive camera, stereo 3D camera, depth sensor, video camera configured to process images to generate depth maps, and so forth. The depth maps can be processed by a control device to locate a user present within a 3D space and also its body parts including a user head, torso and limbs. The term "image sensor," as used herein, refers to any suitable electronic device capable to generate still or motion images of the 3D scene. Some examples of image sensors include a video camera, photo camera, charge-coupled device (CCD), and so forth. The term "field of view," as used herein, refers to the extent of 3D space covered and "viewed" by the image sensor and/or depth sensor.

The term "control device," as used herein, refers to any suitable computing apparatus or system configured to process data, images, depth maps, user inputs, and so forth. Some examples of control device include a desktop computer, laptop computer, tablet computer, gaming console, audio system, video system, cellular phone, smart phone, set-top box, television set, and so forth. In certain embodiments, at least some elements of the control device are incorporated into the display device (e.g., in a form of head-wearable computer). The control device can be in a wireless or wired communication with a depth sensor/image sensor and a head mounted display. The control device is also responsible for generating images displayable further on the head mounted display (e.g., generate a virtual reality). In certain embodiments, the term "control device" refers to a "computing device," "processing means" or merely a "processor".

According to embodiments of the present disclosure, a head mounted display can be worn by a user within a particular 3D space such as a living room of premises. The user can be present in front of a depth sensor/image sensor which track user's motions. The control device processes data received from the depth sensor/image sensor and, by the result of the processing, the control device identifies the user, user's motions/gestures, and track coordinates of the virtual skeleton within the 3D space.

With reference now to the drawings, FIG. 1 is an example scene 100 suitable for implementation of various aspects of the present technology, in accordance with an embodiment of the disclosure.

In particular, there is shown a user 105 wearing a head mounted display 110. The user 105 is present in a 3D space being in front of a control device 115 which includes a depth sensor and/or image sensor so that the user 105 can be easily tracked. The control device 115 is coupled to or is a part of a gaming device or a gaming console 120, and can be also in operative communication with the head mounted display 110 and some other peripheral devices such as a TV display 130, audio system, etc.

In order to be tracked by the control device 115, the user 105 shall be present within the field of view of the depth sensor and/or image sensor of the control device 115, which area is also referred to herein as a "scene" 135. If the user 105 moves out of the scene 135, he would not be tracked and thus his interaction with the control device 115 is interrupted. Alternatively, the user 105 can move towards a tangible obstacle 140 such as a table, chair, toy, and so forth. Because the user 105 may not see the real world or have a diminished view of the real world while wearing the head mounted display 110, he may hit the obstacle 140 and get an injury. Accordingly, the present technology is directed to warn the user 105 if he approaches an edge of scene 135 or one or more obstacles 140.

Figure 2:
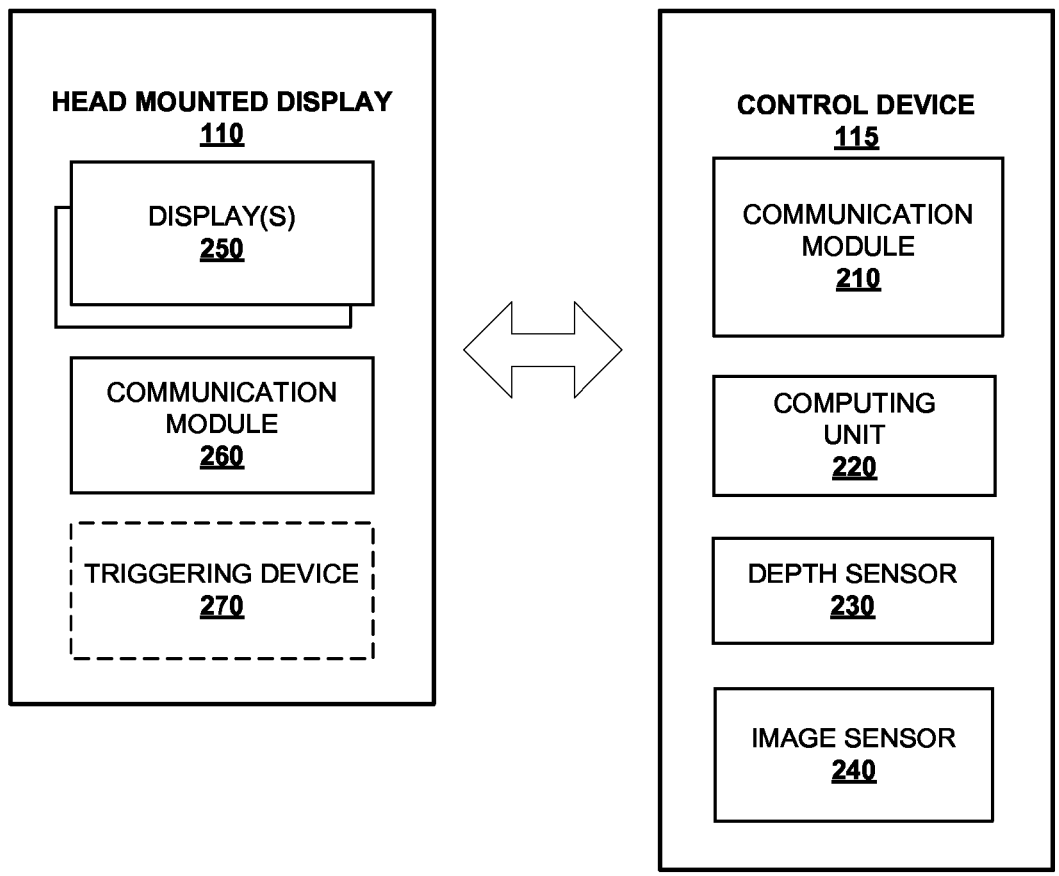
FIG. 2 is an example system suitable for employing methods for cautioning a user of a head mounted display, in accordance with an embodiment of the disclosure.

FIG. 2 is an example system 200 suitable for employing methods for cautioning a user of a head mounted display, in accordance with an embodiment of the disclosure.

As shown in FIG. 2, the system 200 includes a head mounted display 110 and a control device 115. The head mounted display comprises one or more displays 250, a communication module 260, and, optionally, a triggering device 270.

In certain embodiments, the display 250 is arranged in front of the one or two user eyes. The display 250 is configured to simulate virtual reality including video games, sport training, entertainment applications, and so forth. In one example embodiment, the display 250 is configured to render three-dimensional (3D) virtual game worlds. The user is able to change a displayable view within the virtual world by turning his head.

In certain example embodiments, the communication module 260 is configured to operatively communicate with the control device 115, and some other peripheral devices such as a TV display 130, audio system, and so forth.

In certain example embodiments, the triggering device 270 is configured to trigger a warning signal sent by the control device 115 to the head mounted display. For example, the triggering device 270 can initiate a display of a displayable image on the display 250 or the fading of brightness of images displayable by the head mounted display to the user. In one example embodiment, the triggering device 270 stops displaying images by the head mounted device. In another example embodiment, the triggering device 270 moves at least one display 250 of the head mounted display 110 away from eyes of the user.

In some example embodiments, the control device 115 comprises a communication module 210, a computing unit 220, a depth sensor 230, and an image sensor 240. The communication module 210 is configured to operatively communicate with the communication module 260 of the head mounted display 110 and other peripheral devices such as a TV display 130, audio system, and so forth.

In certain embodiments, the communication module 210 is configured to transmit images of a scene captured by the depth sensor 230 and/or the image sensor 240 to the computing unit 220. In certain embodiments, the computing unit 220 is configured to process images of the scene received from the depth sensor 230 and/or the image sensor 240, track the location of the user based on the received images and determine that the user approaches an edge of the scene. The computing unit 220 is further configured to send warning messages to the head mounted display 110 about the proximity of the scene edge.

In certain embodiments, the computing unit 220 sends triggering signals to the triggering device 270 based on the processed images of the scene. In certain embodiments, the depth sensor 230 captures video data in 3D under any ambient light conditions. The sensing range of the depth sensor 230 is adjustable and automatically calibrated based on the physical environment based on the presence or absence of furniture or other obstacles.

In certain embodiments, the image sensor 240 is a device that converts an optical image into an electronic signal. The image sensor 240 can include, for example, one or more video cameras that are sensitive to the visual range, IR cameras sensitive to one of the IR bands, UV cameras or other direct or indirect image-generating sensor systems, for example, radar or laser radar. Images from the depth sensor 230 and the image sensor 240 can be combined by data fusion and be displayed to the user.

Figure 3:
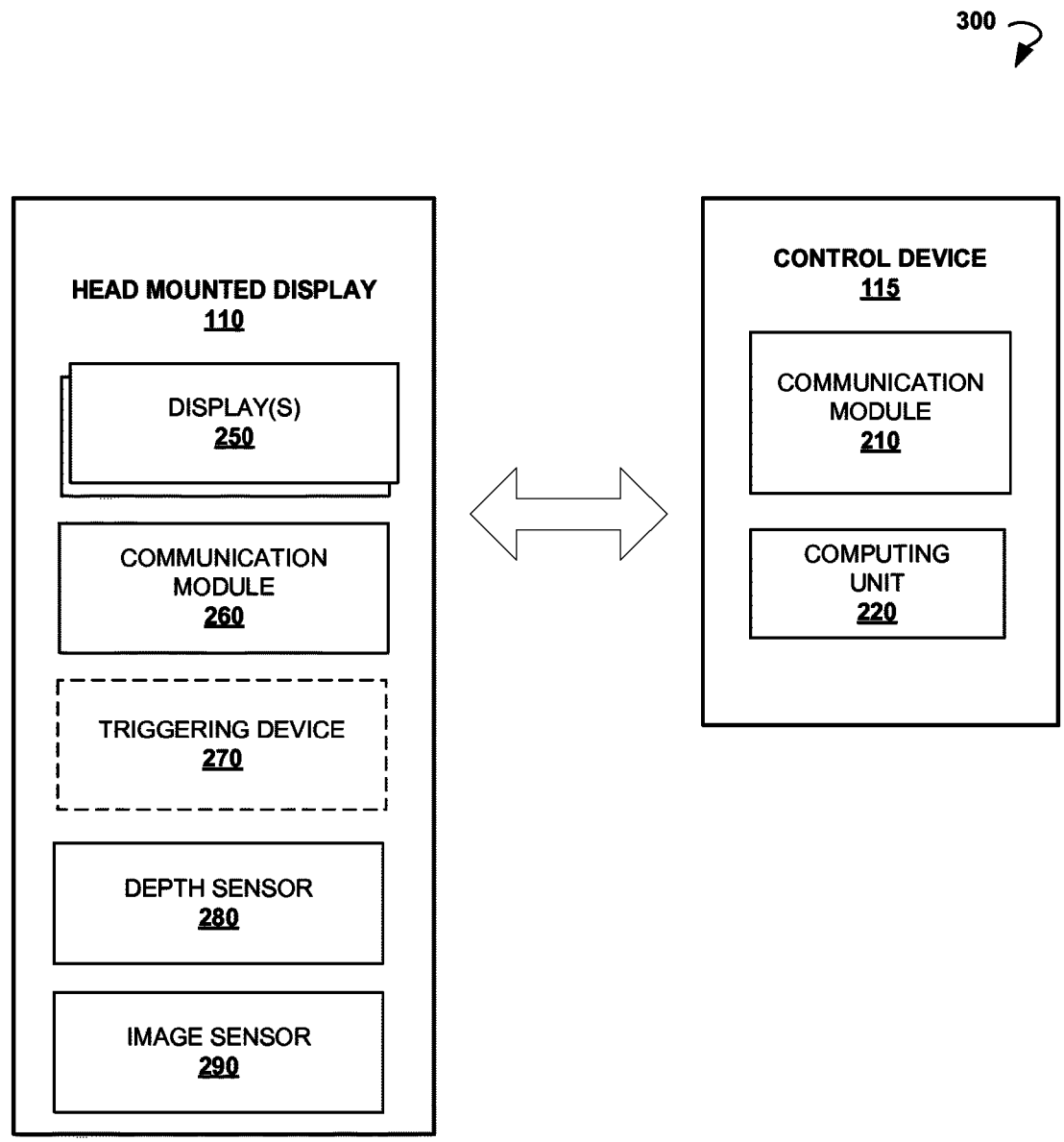
FIG. 3 is another example system suitable for employing methods for cautioning a user of a head mounted display, in accordance with an embodiment of the disclosure.

FIG. 3 is another example system 300 suitable for employing methods for cautioning a user of a head mounted display, in accordance with an embodiment of the disclosure. The system 300 is similar to the system 200 shown in FIG. 2, except that a depth sensor 280 and image sensor 290 are secured to the head mounted display 110.

Figure 4:
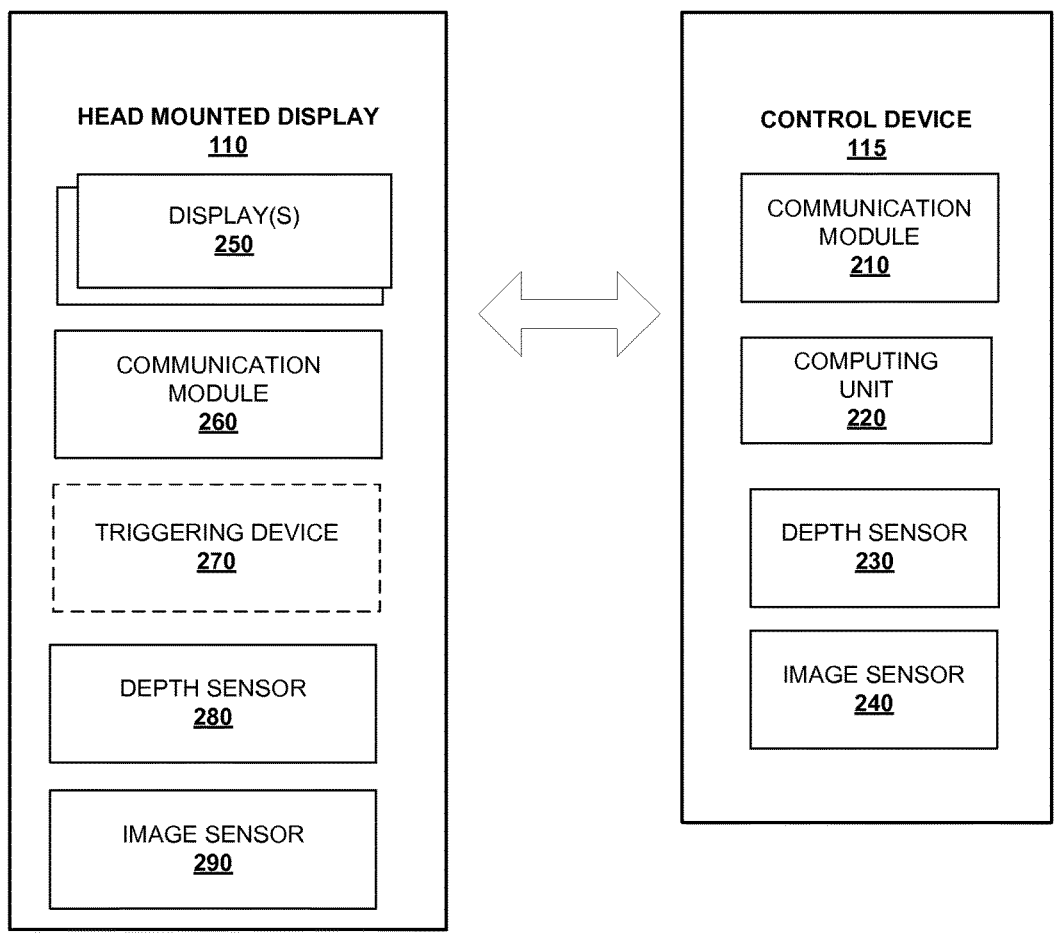
FIG. 4 is yet another example system suitable for employing methods for cautioning a user of a head mounted display, in accordance with an embodiment of the disclosure.

FIG. 4 is yet another example system 400 suitable for employing methods for cautioning a user of a head mounted display, in accordance with an embodiment of the disclosure. The system 400 is similar to the system 200 shown in FIG. 2, except that the head mounted display 110 includes both the depth sensor 280 and image sensor 290 and the control device 115 includes both the depth sensor 230 and the image sensor 240.

Figure 5:
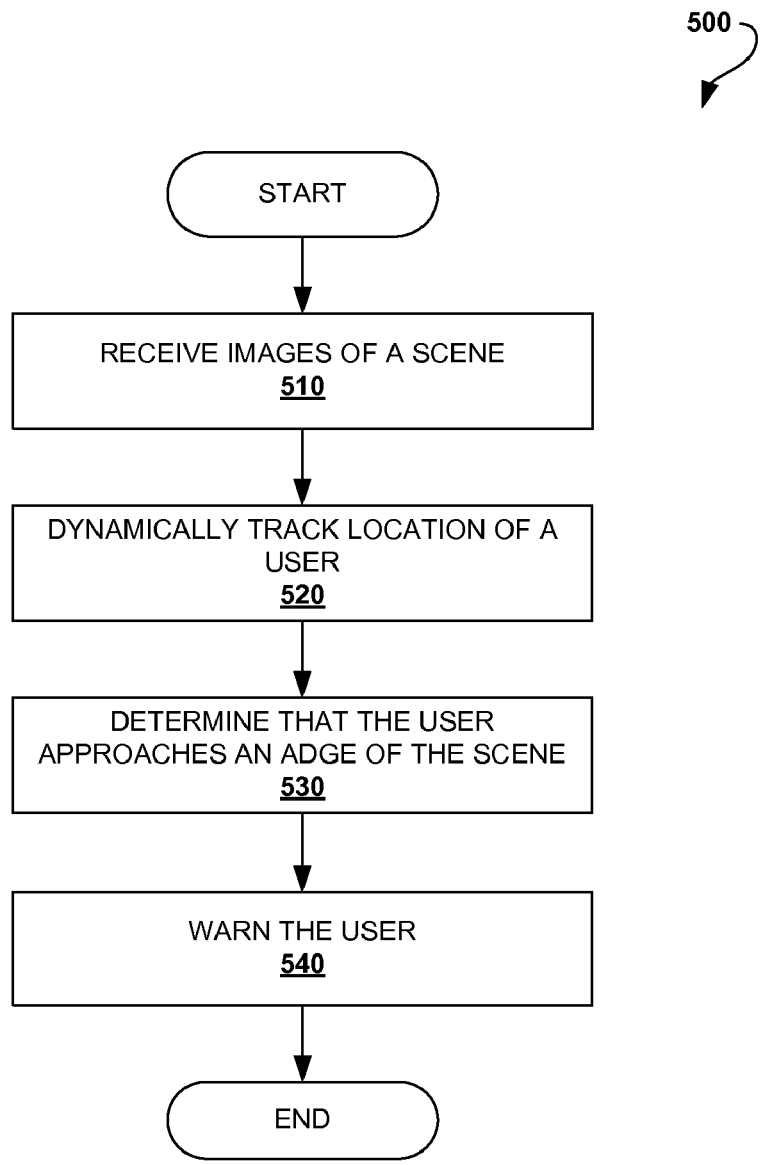
FIG. 5 is a process flow diagram showing a method for cautioning a user of a head mounted display, in accordance with an embodiment of the disclosure.

FIG. 5 is a process flow diagram showing a method 500 for cautioning a user of a head mounted display, in accordance with an embodiment of the disclosure.

The method 500 is performed by processing logic that includes hardware (e.g., dedicated logic, programmable logic, and microcode), software (such as software run on a general-purpose computer system or a dedicated machine), or a combination of both. In one example embodiment, the processing logic resides at the head mounted display. In another example embodiment, the processing logic resides at the control device. In yet another example embodiment, the processing logic resides at both the head mounted display and the control device.

As shown in FIG. 5, the method 500 can commence at operation 510 with receiving images and/or depth data of a scene, within which the user using a head mounted display, is present. The scene includes a predetermined three-dimensional area. The images of the scene are captured by one or more sensors, for example an image sensor or a depth sensor. Thus, the scene can be defined by a field of view of the one or more sensors. The one or more sensors can be coupled to the head mounted display. The head mounted display is a wearable computer with a display, a head mounted electronic device, a head-coupled display, a helmet-mounted display, and so forth. Alternatively, the one or more sensors are coupled to the control device.

The method 500 proceeds with tracking, at operation 520, of location information of the user based at least in part on the images and/or depth data of the scene received from the one or more sensors. The method 500 further proceeds with dynamically determining, at operation 530, that the user approaches an edge of the scene. The determination is based at least in part on the tracking performed at operation 520. In one example embodiment, the edge of the scene includes one or more tangible obstacles, such as a coffee table, a chair, and so forth.

At operation 540, the user is warned that the user approaches the edge of the scene based on the determination performed at operation 530. The warning can include an audio message, a visible message, turning on light emitting diodes, gradual fading of images displayed on the head mounted display, blending displayed images in the real world view, vibrating the head mounted display, disengaging the head mounted display or parts thereof, moving the head mounted display away from the eyes of the user, and the like.

In one example embodiment, the method 500 further includes receiving secondary images of the scene from one or more secondary sensors. The one or more secondary sensors are coupled to the control device. In certain embodiments, the one or more secondary sensors track the location of the user based at least in part on the secondary images of the scene. Based on the secondary images, additional warnings may be provided to the head mounted display if the user continues to move in direction of the edge of the scene. Alternately, if the user ceases to move in the direction of the edge of the scene and moves toward the center of the scene, the images displayed on the head mounted display are gradually faded into focus, or the head mounted display or parts thereof are re-engaged, the head mounted display is moved toward the eyes of the user, and the like.

Figure 6:
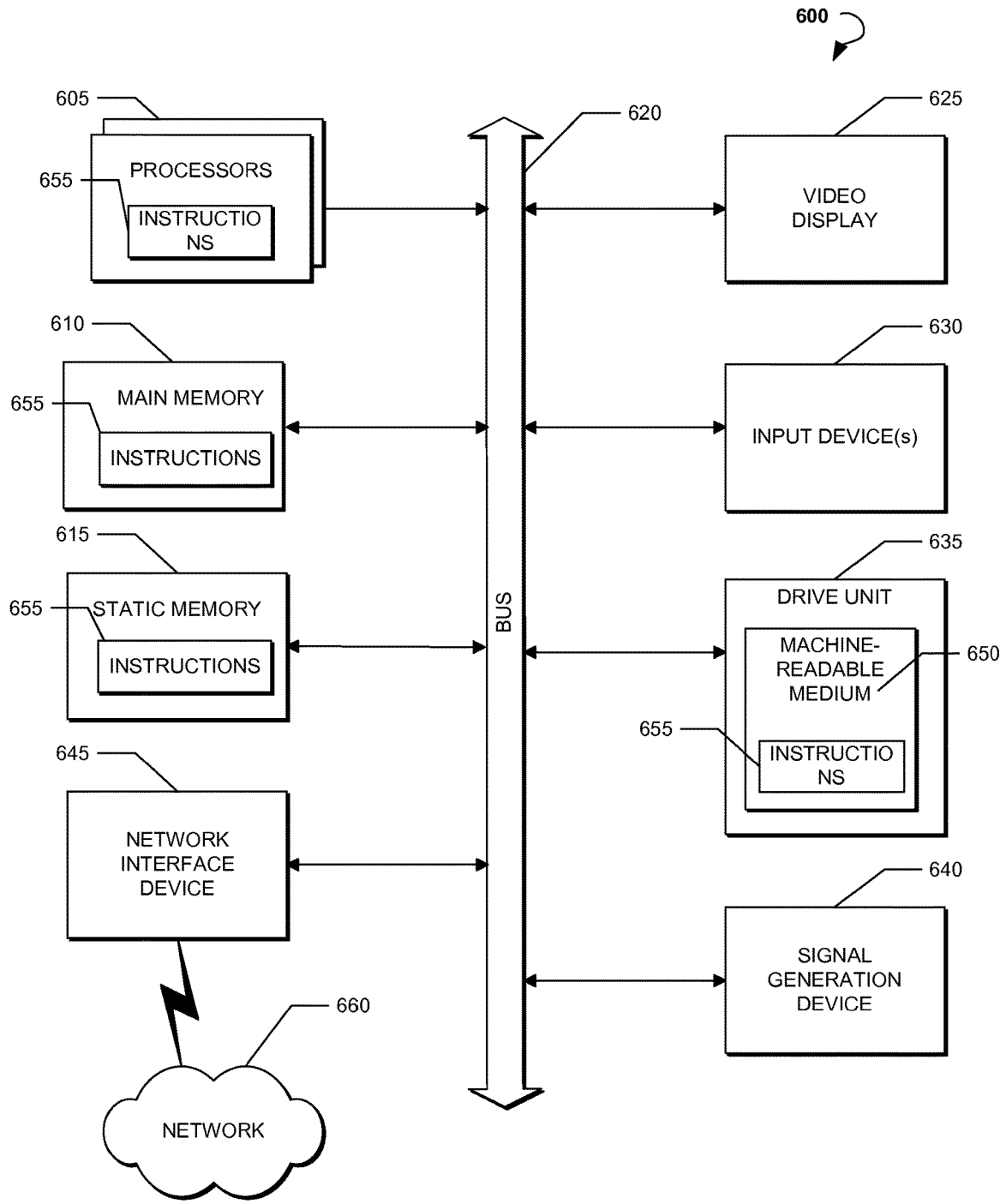
FIG. 6 is a diagrammatic representation of an example machine in the form of a computer system within which a set of instructions for the machine to perform any one or more of the methodologies discussed herein is executed.

FIG. 6 shows a diagrammatic representation of a computing device for a machine in the example electronic form of a computer system 600, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, set-top box (STB), PDA, cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 600 includes a processor or multiple processors 605 (e.g., a central processing unit (CPU), a graphics processing unit (GPU), or both), and a main memory 610 and a static memory 615, which communicate with each other via a bus 620. The computer system 600 can further include a video display unit 625 (e.g., a LCD or a cathode ray tube (CRT)). The computer system 600 also includes at least one input device 630, such as an alphanumeric input device (e.g., a keyboard), a cursor control device (e.g., a mouse), a microphone, a digital camera, a video camera, and so forth. The computer system 600 also includes a disk drive unit 635, a signal generation device 640 (e.g., a speaker), and a network interface device 645.

The disk drive unit 635 includes a computer-readable medium 650, which stores one or more sets of instructions and data structures (e.g., instructions 655) embodying or utilized by any one or more of the methodologies or functions described herein. The instructions 655 can also reside, completely or at least partially, within the main memory 610 and/or within the processors 605 during execution thereof by the computer system 600. The main memory 610 and the processors 605 also constitute machine-readable media.

The instructions 655 can further be transmitted or received over a communications network 660 via the network interface device 645 utilizing any one of a number of well-known transfer protocols (e.g., Hyper Text Transfer Protocol (HTTP), CAN, Serial, and Modbus). The communications network 660 includes the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications also includes links to any of a variety of wireless networks including WAP (Wireless Application Protocol), GPRS (General Packet Radio Service), GSM (Global System for Mobile Communication), CDMA (Code Division Multiple Access) or TDMA (Time Division Multiple Access), cellular phone networks, Global Positioning System (GPS), CDPD (cellular digital packet data), RIM (Research in Motion, Limited) duplex paging network, Bluetooth radio, or an IEEE 802.11-based radio frequency network.

While the machine-readable medium 650 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Figure 7:
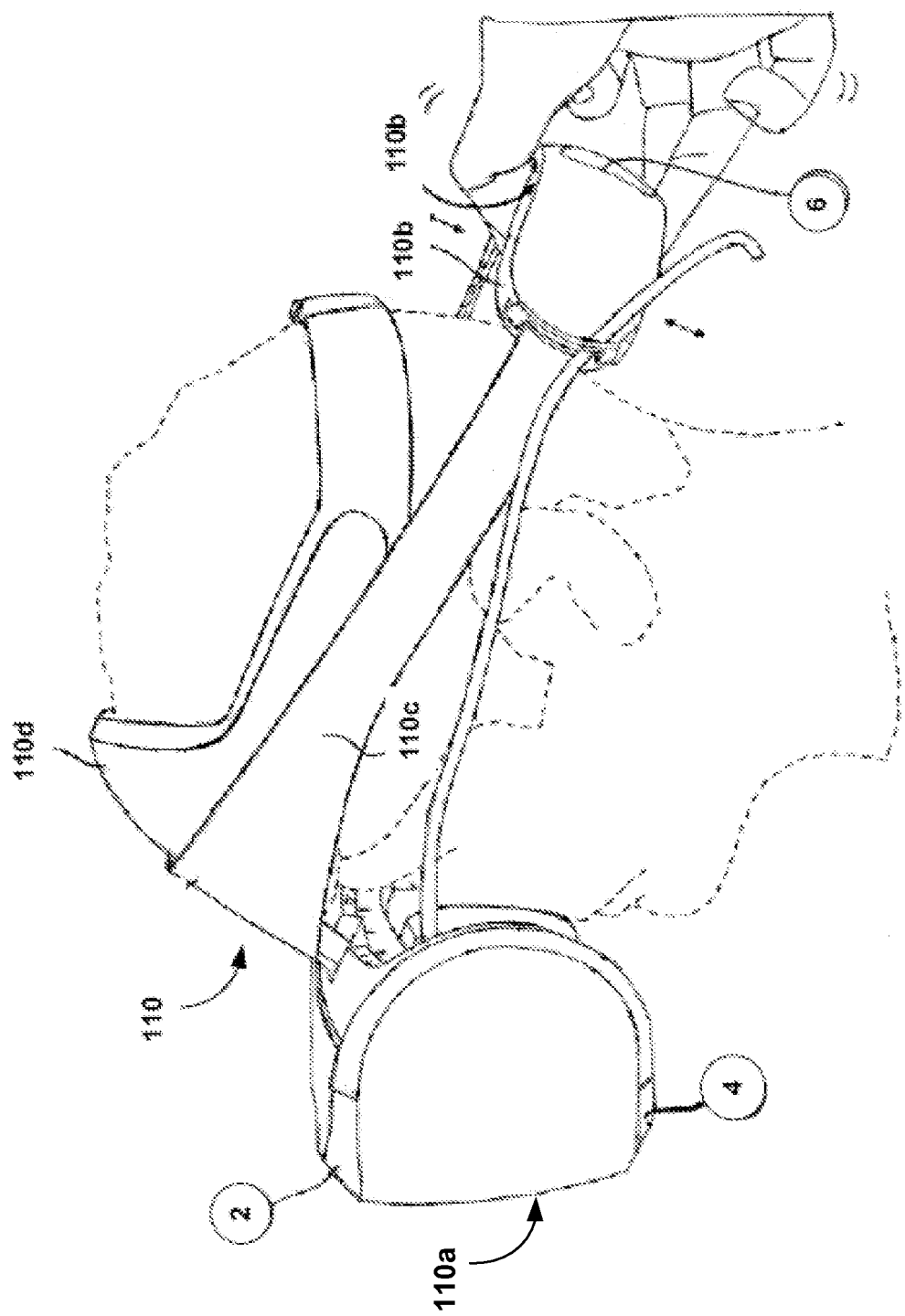
FIG. 7 illustrates different parts of an exemplary head mounted display worn by a user, in accordance to one embodiment.

FIG. 7 illustrates an overview of an exemplary head mounted display used by a user for viewing and/or interacting with multimedia content. The HMD worn by a user, in one example, allows the user to view rich multimedia content, including interactive scenes from video games, scenes from movies, internet content, and other types of interactive and non-interactive content. The tracking of position including orientation, location, direction, etc., of the HMD is enabled by tracking a plurality of marker elements, such as light emitting diodes, infra-red markers, visual marker elements, etc., distributed across different external surfaces of the HMD using a combination of sensors or based on one or more variables used to define a volume surrounding the HMD. Some of the sensors used for tracking include, without limitation, inertial sensors within the HMD that allow movement tracking of the HMD, one or more image sensors and one or more depth sensors, wherein the image sensors and depth sensors allow optical tracking. The tracking using inertial sensors may be enabled using one or more accelerometers and one or more gyroscopes that are disposed within the HMD. The image sensors may include one or more single-lens camera, IR camera, stereo camera, etc., and depth sensors may include one or more depth sensing cameras, ultrasonic camera, three-dimensional (3D) stereo cameras, video cameras, etc. The image sensors and depth sensors encompass one or more cameras provided within the HMD as well as external cameras that are dispersed within a real-world scene of the user wearing the HMD. The images sensors and/or the depth sensors within the HMD, for example, are used to capture images/videos of the real-world objects/scenes in the immediate vicinity of the user from the perspective of the user wearing the HMD. The captured images/videos may be rendered in the display portion of the HMD when content is being adjusted, as will be explained further below.

The image and/or depth sensors distributed externally within the scene of the user, for example, are configured to capture images/videos of the various markers, such as lights, light emitting diodes (LEDs), infra-red markers, etc., distributed across the external surface of the HMD 110. In one embodiment, the images/videos are transmitted to a client system where the images/video frames are analyzed to accurately determine the location of the HMD. Additionally, the images/videos are analyzed within the HMD to determine the location, orientation, direction of the HMD with reference to other objects in the real-world scene. In one configuration, the HMD includes LEDs (for e.g., represented by bubbles 2, 4 and 6) disposed at strategic locations on one or more external surfaces of the HMD. For instance, the LEDs may be disposed on the four corners of the front block unit 110*a* (e.g., also referred to herein as the optics block) of the HMD and two on the rear/back section 110*b* of the HMD

110. The rear section 110*b* is disposed on an adjustable band unit. The HMD may also include other surfaces, such as 110*c* and 110*d* to allow the user to safely and securely harness the HMD on the user's head. In some embodiments, the front LEDs are configured to be partially disposed on the front surface and partially on side surfaces that are disposed on each side of the front surface, to define a partial L-shape, a curved L-shape, a boomerang shape, a curved rectangle, a curved line, a spot, a circle, a pattern, or combinations thereof. The markers are not restricted to LEDs but can also include lights, infra-red markers, color coded markers, reflective markers, etc. The analysis of the images/video frames are used to compute relative distance of the different markers of the HMD from one another and from one or more reference points. The computed distances are used to determine a volume around the HMD and changes to the volume during use to more accurately define the HMD's position. Additionally, the video frames/images captured by the various sensors are analyzed to determine position including orientation, location, direction of movement of the various markers to more accurately determine the direction of movement or position of the user wearing the HMD. It should be noted that the volume surrounding the HMD may remain the same while the location, orientation and direction of the various markers may change during use, for example, when the user wearing the HMD is spinning around. The analysis of the video frames/images will provide a more accurate measure of the location, direction and orientation of the HMD. As a safety precaution, the movement of the HMD is analyzed. When the movement exceeds a certain pre-defined threshold value or is determined to be unsafe (e.g., user is falling backwards), a signal can be generated to cause interruption of the interactive scenes currently being rendered on a display screen of the HMD. Alternately, some other form of warning may be generated to signal to the user that they may be moving in an unsafe manner.

The HMD is configured to provide a view into an interactive scene of a video game, for example, at the display portion of the HMD. The user wearing the HMD will be able to move his or her head in any direction to view other parts of the interactive scene and provide inputs to move about in the rendered virtual interactive scene, based on the user's head movement. In one embodiment, the virtual interactive scene is rendered in a rich three dimensional (3D) format. In one configuration, the HMD is configured to communicate with a client computer system 106, which renders the content presented to the HMD. The content (e.g., game, movie, video, audio, images, multimedia, etc.), in another configuration, may be streamed from a remote server or servers to the HMD using cloud gaming infrastructure 112. In some examples, the content from the remote server(s) is downloaded to a client system and then transferred to the HMD for rendering. In other examples, the content is directly streamed from the remote server(s) to the HMD for rendering.

When the user wearing the HMD is facing an image/depth sensor camera, the camera should be able to view all LEDs and/or markers disposed in the front face of the HMD 110. Alternately, the camera should be able to track at least one LED and/or maker disposed in the front face of the HMD 110. A geometric model of the HMD available at the client system, for example, can be accessed by programs, such as game or other programs, executing on the client system, to determine depth (relative to the camera) and orientation of the user's head when wearing the HMD. For instance, four LEDs disposed on the corners (e.g., outlining a rectangular shape) of the front surface of the HMD and two LEDs disposed in the back surface of the HMD may be tracked by capturing images/video frames to determine if the user is viewing down, up or to the sides. Other marker elements, in addition to or instead of the LEDs, disposed across different external surfaces of the HMD may also be used to determine the orientation, direction, location, etc., of the HMD worn by the user based on the user's actions in the form of head movement.

Figure 8:
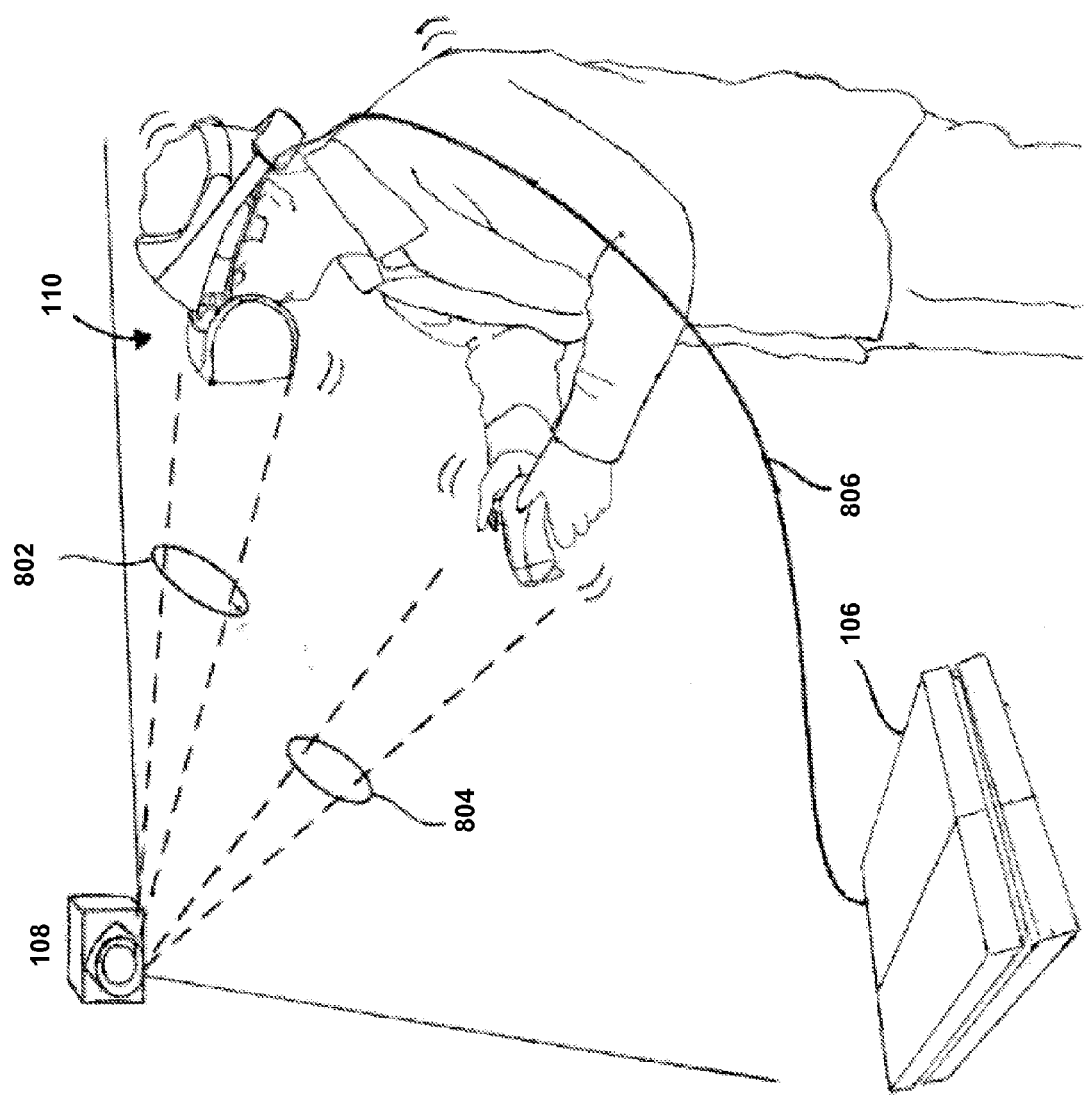
FIG. 8 illustrates tracking of a head mounted display and a controller worn/handled by a user, in one embodiment of the invention.

FIG. 8 illustrates an example of a user wearing the HMD 110, during use, in accordance with one embodiment. In this example, the position of the HMD is tracked using image data 802 extracted from images/video frames captured by the camera 108. In some embodiments, in addition to tracking the position of the HMD, a controller held by the user and used to provide input to the content rendered on the HMD, may also be tracked. As illustrated in FIG. 8, the controller is tracked using image data 804 extracted from captured video frames by the camera 108. FIG. 8 shows an exemplary configuration where the HMD is connected to the computing system (i.e., client device) 106 via a cable 806. Cable 806 is capable of transmitting rich media data and signals between the HMD and the client computing system 106. In one embodiment, the HMD obtains power through the cable 806. In an alternate embodiment, the power for the HMD can be obtained via another cable connected to a power source. In still another embodiment, the HMD can have a battery that is rechargeable, so as to avoid extra power cords.

Figure 9:
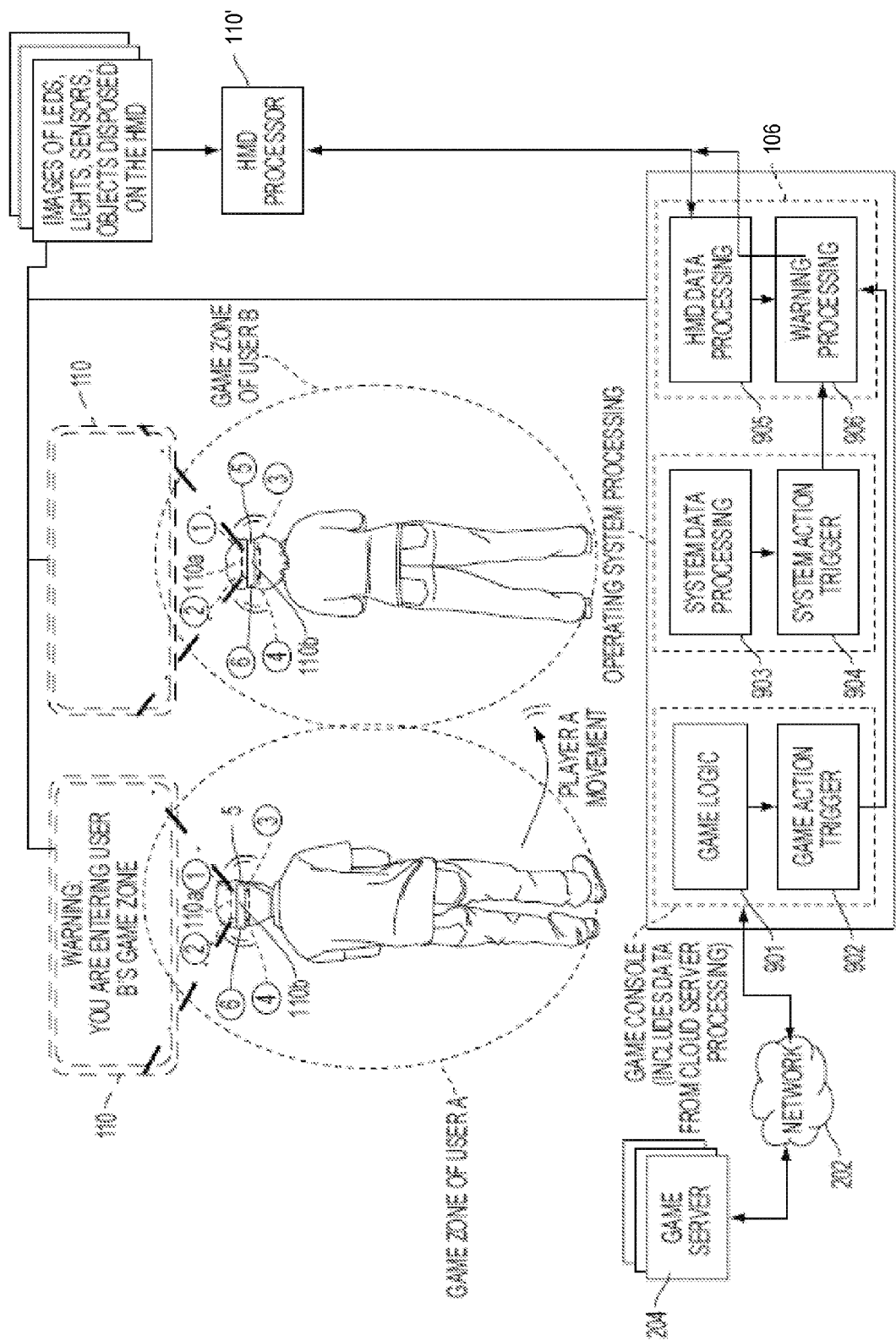
FIG. 9 illustrates the various modules used in tracking the head mounted display and the data flow between the head mounted display and the client device/cloud server, in accordance to one embodiment.

FIG. 9 illustrates an embodiment of a system that is used for providing warning to a user (or player) when the user comes close to a real-world object, an edge of a scene, enters other player's game zone, or turns/moves away from the client device, based on user actions while watching interactive scenes on the display portion of the HMD. The system may also be used to adjust content rendered on the display portion of the HMD based on the user's actions. The embodiment shown in FIG. 9 illustrates two players engaged in interactive gameplay of a video game. The interactive scenes from the video game are rendered on the display portion of the respective HMDs of the two players. The interactive scenes for the video game are provided by a client device, such as a game console (not shown in FIG. 9), where the game is executing or is downloaded from a game server 204 (where the game is executing) via the network 202 to the game console and rendered on the HMDs. Alternately, the interactive scenes may be streamed directly from the game server 204 via the network 202 to the HMDs 110'. The interactive scenes are rendered in the display portion of the respective HMDs.

The position of the HMDs and the controllers handled by the players are tracked by one or more image sensors, inertial sensors and/or depth sensors. The images/videos capture the respective player's actions, such as movement of the hand(s) operating a controller, change in position including location, direction and orientation, of the HMD and/or the controller. The captured images/video frames are analyzed to detect position of the HMD and/or the controller of each player by determining location of the various markers, such as markers defined by LEDs (1, 2, 3, 4 (not shown), 5 and 6) on each of the HMDs. In one embodiment, a processor within the client device, such as a game console 106, receives the captured images/video frames of the markers disposed on each of the HMDs and analyzes the content captured therein to identify the position of the HMD based on the captured images/video frames of the markers disposed on the respective HMDs. Similar analysis of the markers disposed on the controller may also be carried out to correctly determine the position of the controller. In some embodiments, a processor in each of the HMD may be used to provide additional data with respect to the movement of the respective HMDs independently and in relation to one another. Accordingly, the processor of the HMD gathers the images/video data and transmits the same to the client device 106 where the analysis is performed. In some embodiments, the relative position of a first HMD with respect to a second HMD may also be similarly computed by obtaining and analyzing the image/video frames of the markers on the other HMD and computing the relative position of the HMD worn by the first player with respect to the HMD worn by the second player. Based on the images/video frames, game zone of each player A and B may be established, as illustrated in FIG. 9.

The client device 106 (also referred to, in some embodiments, by reference numeral 120 (FIG. 1)) includes a plurality of modules that are used in analyzing the data within the image/video frames captured by the various sensors, identifying appropriate content to be rendered at the display portion of the HMD and transmitting the appropriate content to the HMD. For instance, a HMD data processing module 905 in the client device 106 is used in analyzing the images/video frames received from the various sensors and determining the position of the HMD and/or the controller worn/held by a user. Analysis information from the HMD data processing module 905 is shared with a warning processing module 906 within the client device 106. In one embodiment, the information from the analysis may identify the proximity of a player to a real-world object, proximity of the player to an edge of a scene, proximity of a player to another player, etc. For instance, in the example illustrated in FIG. 9, during interaction with the video game, player A may intrude into player B's game zone or vice versa. In this instance, the various images/videos of the two players captured by the sensors distributed within the respective HMDs and throughout the real-world scene of the two players are analyzed to determine the extent of intrusion of player A into player B's game zone or vice versa. Depending on the actions of the players in the video game, such intrusion may result in first player potentially injuring the second player or vice versa. In order to prevent any harm to the players and to provide a safe playing experience, the analysis information of the images/video frames may be used by the warning processing 906 to generate a signal for warning the respective players.

In addition to the HMD processing module analyzing the images/videos information, a game logic module 901 may also analyze the images/videos and share the analysis information with a game action trigger module 902. In this instance, the HMD processing module 905 shares the images/video information with the game logic module 901. The analysis by the game logic module may be specific to the video game currently executing and may be performed with reference to the game context. For example, the game logic module may analyze the images/video frames received at the client device with respect to the game intensity context. Information from the game logic module 901 may be used by the game action trigger module 902 to initiate an appropriate game specific trigger action. The game specific trigger action may include a flag identifying that it is a high-intensity game or a low-intensity game. The game specific trigger action may be provided to the warning processing module 906 for generating an appropriate warning signal for transmitting to the HMD.

In one embodiment, the images/video frames captured by the various sensors are transmitted to the game server 204 over the network 202 where the images/video frames are analyzed and the analyzed data is transmitted to the game logic module 901 for sharing with the game action trigger 902. Based on the analyzed data, the game action trigger 902 determines which action trigger to initiate.

In addition to the game specific analysis performed by the game logic module 901, a system data processing module 903 may also be used to analyze the images/video frames received from the HMD data processing module to provide system specific action trigger. For example, the system data processing module 903 may analyze the images/video frames in the context of the system setting and provide appropriate data to the system action trigger module 904. The system action trigger 904 determines which action trigger to initiate. Data from the system action trigger 904 is also transmitted to the warning processing module 906. The warning processing module 906 receives the game specific action triggers and system specific action triggers as well as the data from the HMD data processing module 905 and generates a warning signal for the HMD processor. The warning signal generated by the warning processing module 906 is transmitted through the HMD data processing module 905 to the HMD. In the HMD data processing module 905, the signal is used to determine if any adjustment to the content needs to be made at the display portion of the HMD of either player A or player B or both. If any adjustment to the content needs to be made, the HMD data processing module 905 will transmit appropriate data content to interrupt the interactive scenes that are being rendered on the display portion of the HMD. In some embodiments, the appropriate data content may convey a warning to the player wearing the HMD. The warning may be to inform the player of the real-world environmental condition detected near the player based on the movement of the HMD worn by the user. In some embodiments, the warning may inform the player of the severity of the real-world environmental safety condition detected near the player based on the movement of the HMD worn by the player. For example, if player A moves into the game zone of player B, then the warning signal may be directed to the player A's HMD to let the player A know that he/she is intruding into player B's game zone. The warning signal may be in the form of a textual warning that is rendered at the display portion of the player A's HMD, as illustrated in FIG. 9, while player B's HMD will continue to render the interactive scenes of the video game. In one embodiment, depending on the intensity of the video game, the textual warning may be rendered at the player A's HMD in the foreground while the interactive scenes of the video game continue to render in the background. In this embodiment, the brightness level of the interactive scenes may be faded and the textual warning presented brightly. In one example, the fading is done in a graduated manner depending on the intensity of the game so as to avoid disorienting the player. In addition to or in place of the textual warning, the warning may be provided in haptic format, audio format, etc.

Figure 10:
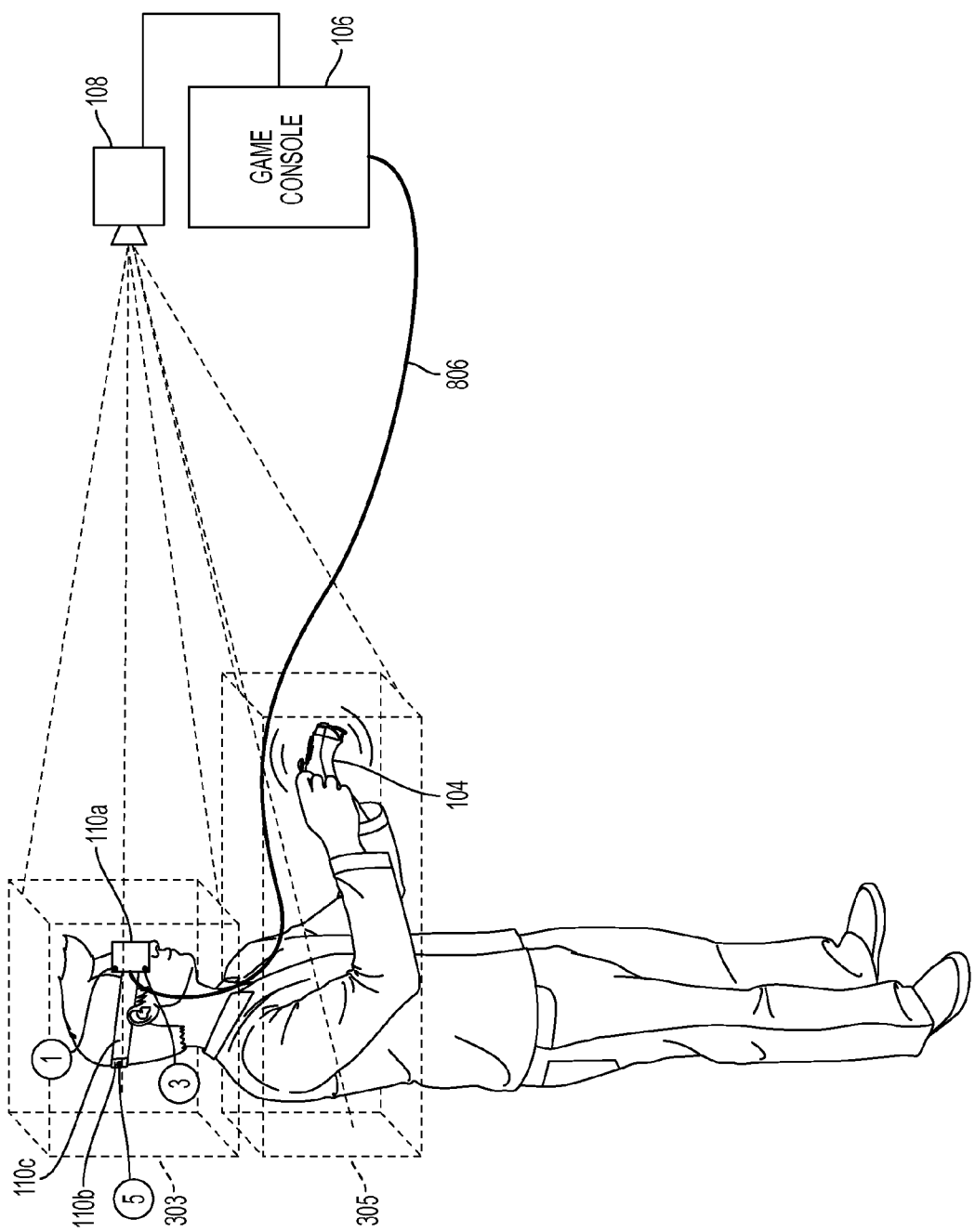
FIG. 10 illustrates an exemplary embodiment for determining position of the head mounted display and/or the controller worn/handled by a user.

FIG. 10 illustrates an exemplary embodiment for determining position of the HMD and/or the controller. In this embodiment, the one or more image sensors and/or depth sensors are used to determine a volume around the HMD worn by a user and or around a controller handled by the user. The volume around the HMD, for example, may be determined using a depth sensor 108, such as a stereo camera, that tracks the location of the various marker elements disposed on the external surface of the HMD worn by the player, in images/videos and associates a depth aspect to the images/videos. Volume around the controller may also be similarly determined. As shown in FIG. 10, the depth sensor 108 may determine a volume 303 around the HMD and a volume 305 around the controller. The volume may be used to more precisely determine the position of the HMD and/or the controller handled by a player.

Figure 10B:
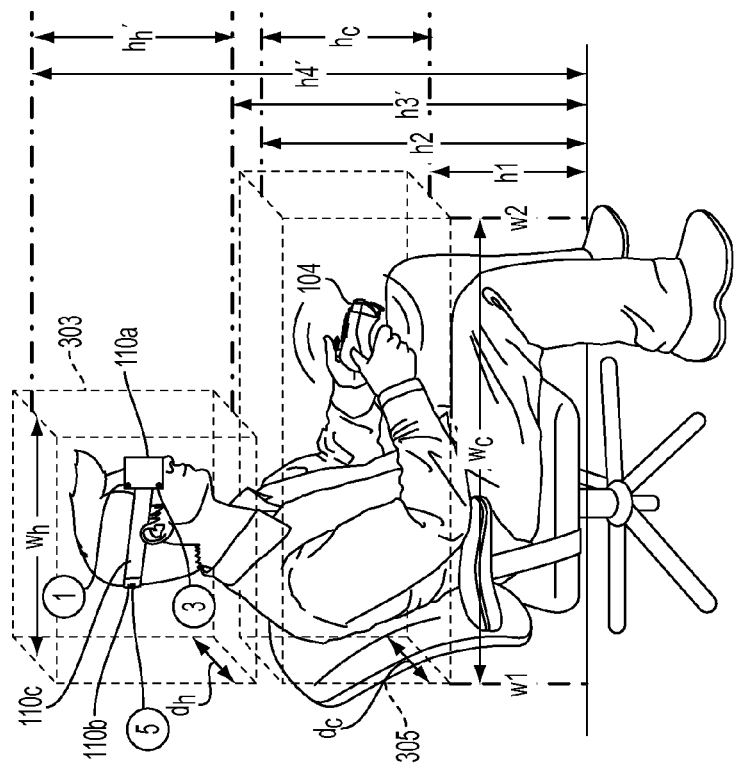
Figure 10A:
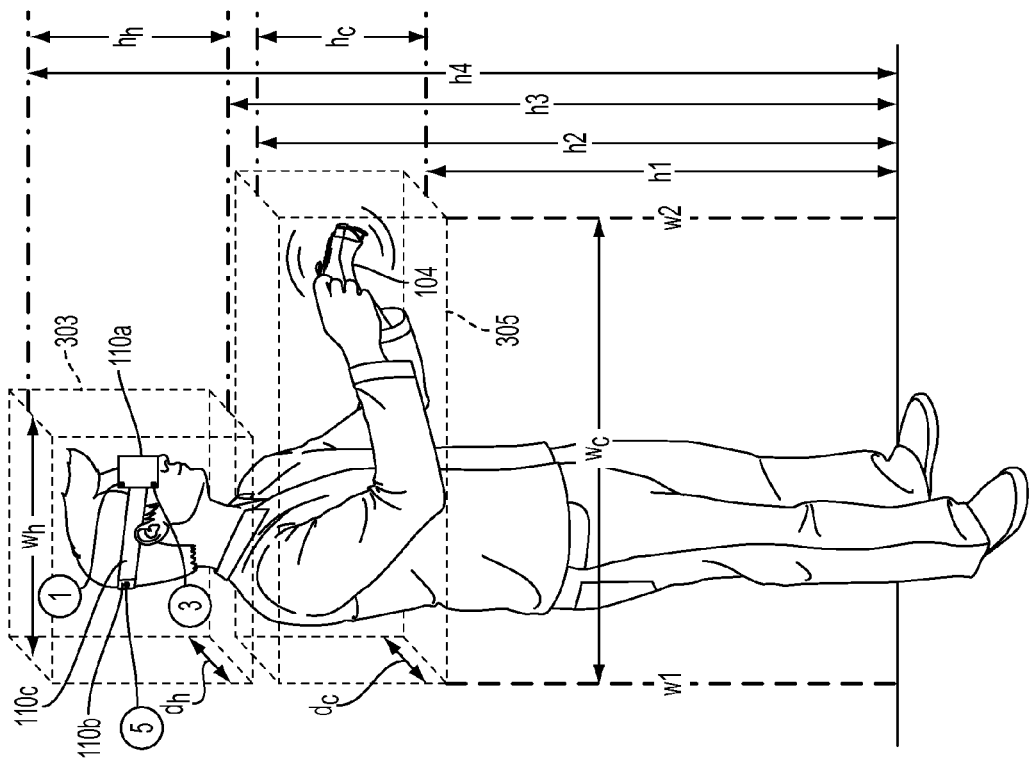

FIGS. 10A and 10B illustrate how an HMD data processing module uses the volume around the HMD and/or the controller to determine a position, such as orientation, location, direction of the user wearing/handling the HMD/ the controller. The HMD data processing module may determine if a player (i.e., user) is sitting or standing when playing the video game. A video game may have certain restrictions on the position of the player. For example for a high intensity game, the video game may require the player to be seated during gameplay in order to avoid player disorientation. When a player starts out playing the video game while sitting and during the course of the gameplay stands, the game processing module may be able to detect a change in the position of the user by determining a change in elevation of the HMD and/or the controller. Based on the game's restrictions and the change in the elevation of the HMD and/or the controller, a warning signal may be generated. To determine the change in the elevation, the initial position of the HMD worn by the player is computed. As shown in FIG. 10A, the image sensors/depth sensors determine one or more variables defining a volume 303 surrounding the HMD. For example, the image sensors/depth sensors may be used to determine a height $h_h$ (wherein $h_h=h4-h3$), depth ($d_h$) and width $w_h$ (wherein $w_h=w1-w2$) for a region surrounding the HMD and the volume around the HMD may be computed as a function of $h_h$, $d_h$ and $w_h$. Similarly, the volume surrounding a controller may be determined by determining a height $h_c$ (wherein $h_c=h2-h1$), depth $d_c$ and width $w_c$, (wherein $w_c=w1-w2$) of a region surrounding the controller 104 and the volume 305 around the controller 104 may be computed as a function of $h_c$, $d_c$ and $w_c$. For simplicity purpose, the width of the region surrounding the controller is shown to be same as the width of the region surrounding the HMD. It should be noted that the variables (i.e., width, height and depth) for the volume surrounding the controller may be different than the variables for the volume surrounding the HMD.

When a player changes his position by sitting, for example, as illustrated in FIG. 10B, the change in elevation of the HMD is detected by the image/depth sensors and a new volume is computed for the HMD by the HMD data processing module. In this example, the variable related to the height has changed and the new height $h_h'$ (wherein $h_h'=h4'-h3'$) of the HMD is computed using the data captured by the image/depth sensors and the new volume of the HMD is computed as a function of $w_h$, $d_h$, $h_h'$. In this example, the volume around the controller (defined by height h1, h2 used for computing $h_c$, and width w1, w2 used for computing $w_c$) may have stayed the same. In alternate examples, the volume around the controller may also have changed and as a result a new volume for the controller may be computed using the change in the respective height and/or width of the controller. Based on the change in the position of the player captured by the images/video frames, the HMD data processing module 905 may send data to adjust the content rendered on the HMD and/or provide warning for the player. The warning may include a request for the player to change his location/position, etc.

FIG. 10C illustrates computing change in position of the HMD/controller based on the player's action, in one embodiment of the invention. An external camera 115, such as depth sensing camera, video camera, etc., may be used to track the relative position of the HMD worn by a player to the controller held by the player at various times. The HMD data processing module uses the images from the camera 115 to detect a change in position of the HMD/controller. A change is detected by computing the initial position of the HMD/controller at time t0 (defined by '$h_1$') and the position of the HMD/controller at time t1 (defined by '$h_2$'). The HMD data processing module further determines if the difference between the two position ($h_1-h_2$) exceeds a pre-defined threshold value. The pre-defined threshold value may be set to allow some variations in the position of the HMD worn by the player that may be caused by the player looking up, down or sideways.

Figure 11D:
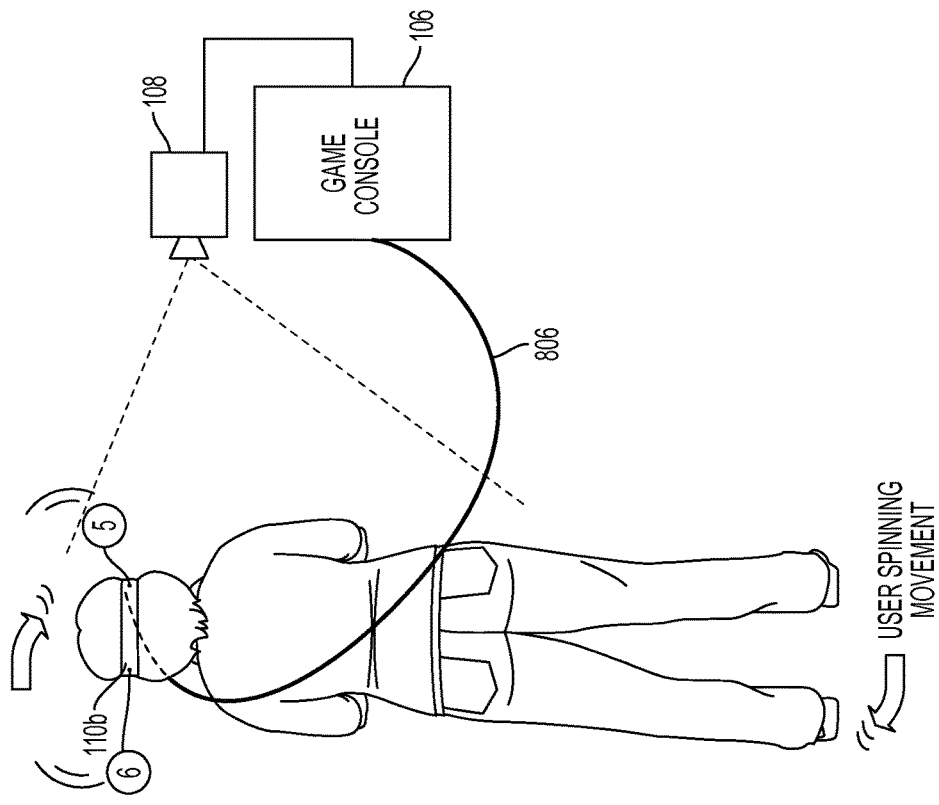
Figure 11C:
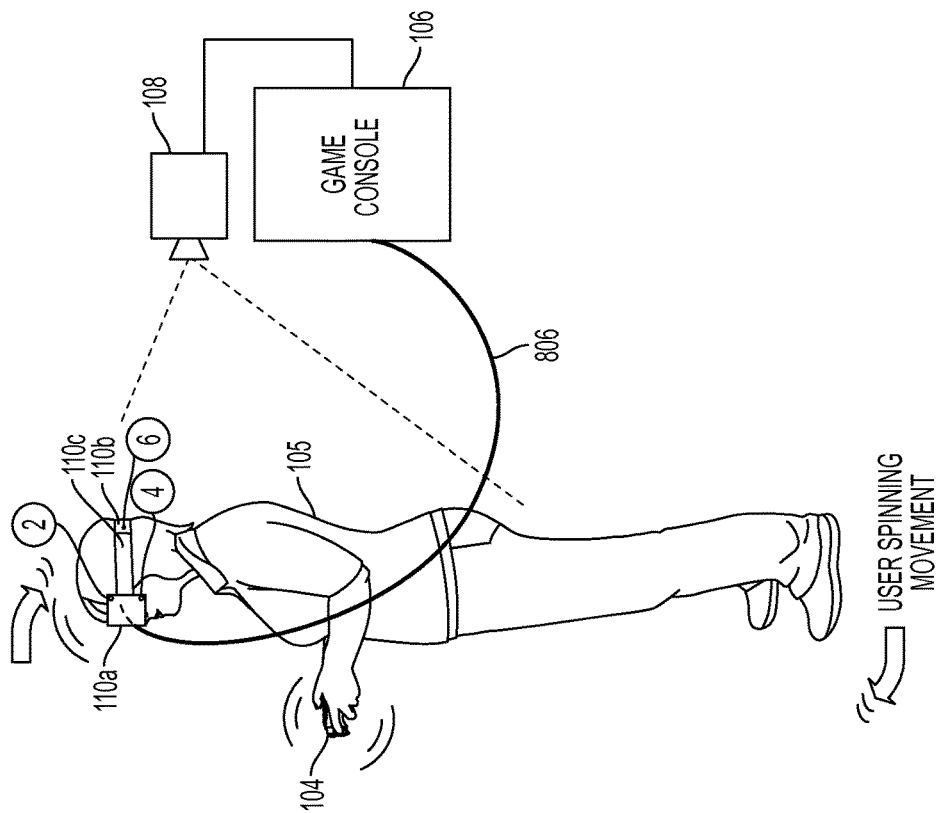
Figure 11E:
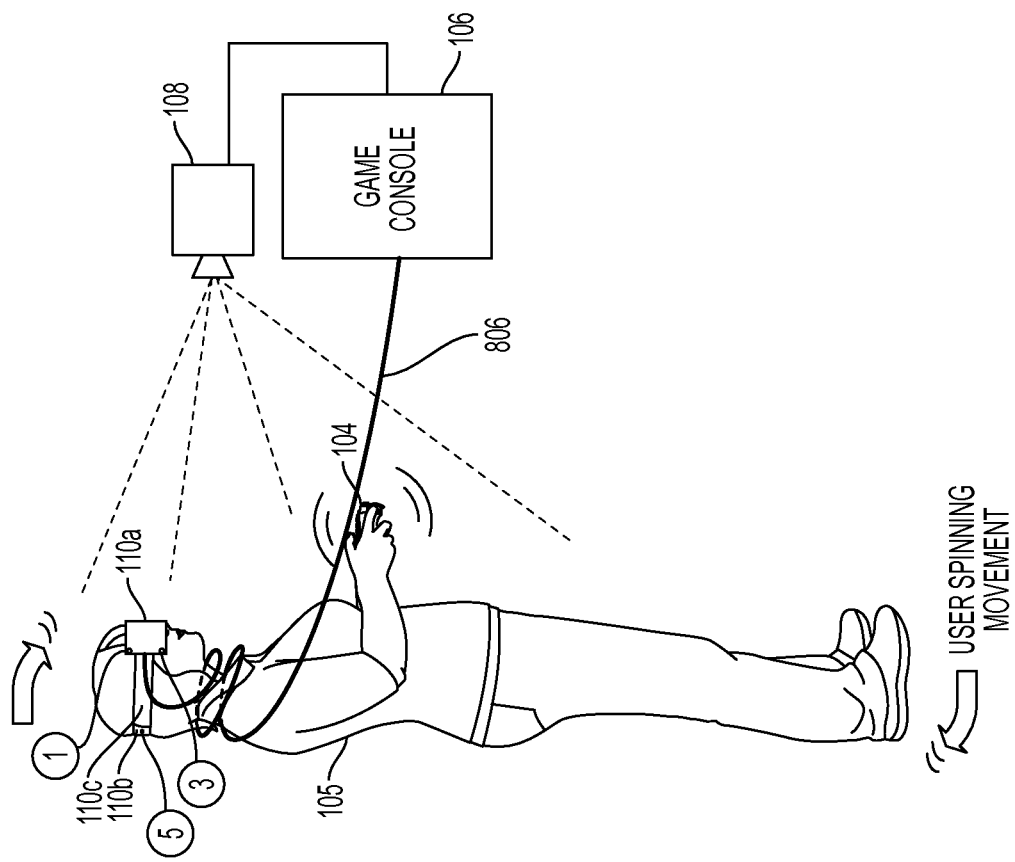

FIGS. 11A-11E illustrate an exemplary embodiment wherein a user's change in orientation may result in a change in environmental safety condition in the vicinity of the user wearing the HMD. The change in HMD's orientation may be tracked and warning signals generated and/or data content transmitted to interrupt the interactive scenes rendering on the HMD of the player, based on the severity of the environmental safety condition detected in the vicinity of the user determined by the tracking. For example FIG. 11A shows the user wearing the HMD interacting with the video game executing on a game console 106, using the controller. The interactive scenes of the video game are rendered on a display portion of the HMD. User interactions at the controller are transmitted wirelessly to the game console 106 and the HMD movement is processed by a processor in the HMD and the processed content transmitted through the cable 806 to the game console 106. The input from the controller and the HMD are used as user input to the video game. The game console updates the interactive game scenes rendered at the HMD based on the input provided by the user. It should be noted that in the various embodiments, a user and a player are used interchangeably to refer to a person who is actively interacting with content presented on a display portion of the HMD. The content may be interactive game scenes of a video game, an interactive application, a social interactive stream, etc. The HMD worn by the user, in FIG. 11A, may be tracked using marker elements, such as LEDs (represented by reference numerals 1-6, for example), visual markers, infra-red markers, etc., and it may be determined from the tracking that the user wearing the HMD is facing forward toward the image/depth sensors 115 of the system (for e.g., game console 12) executing the video game, at time t0. During the gameplay, the user may start to spin around. As a result of the spinning, the user may turn right at time t1, as illustrated in FIG. 11B. The cable 806 connecting the HMD to the game console/client device slowly begins to wrap around the user, leading to a potential safety hazard to the user. As the user continues to spin, the user turns right and faces backward at time t2 away from the image/depth sensors of the system, as illustrated in FIG. 11C, and face left at time t3, as illustrated in FIG. 11D. The cable 806 continues to wrap around the user. If the user continues to spin around, the cable 806 may continue to wrap around the user's neck and/or body, as illustrated in FIG. 11E, wherein it is shown that the cable has wrapped twice around the neck of the user, that may cause potential harm to the user. The user may not even be aware of this wrapping as he/she may be totally immersed in the video game. Further, as can be seen in FIG. 11E, the wrapping of the cable causes the cable to become taut. In order to prevent the cable from becoming a safety hazard to the user, causing bodily harm to the user, and/or resulting in the un-plugging of the HMD, the HMD data processing module may detect the change in position of the HMD, identify the environmental safety condition, and automatically provide appropriate warnings and/or data to adjust/interrupt content rendered on the HMD's display portion. The spinning action, for example, may be detected by the inertial sensors (one or more gyroscopes and one or more accelerometers) of the HMD. The HMD data processing module may analyze the positional data of the HMD worn by the user to adjust content and/or provide warning messages.

FIG. 11F illustrates yet another hazard that may befall a user when the user performs certain actions while still immersed in gameplay of the video game, in one exemplary embodiment. In this embodiment, a user playing the video game (at time t0) may turn around and being to walk away from the game console, (as shown by user's position at time t1 and t2 in FIG. 11F) while continuing to interact with the video game. The position of the player is tracked using the LEDs, for example, disposed around the external surfaces of the HMD. In the embodiment illustrated in FIG. 11F, the user's initial position is determined by tracking the LEDs 1-6 disposed on the front portion 110a and back portion 110b of the HMD. Although FIG. 11F shows only LEDs 2 and 4 on the front portion 110a, it should be noted that the LEDs 1 and 3 disposed on the other side of the HMD are also tracked. The user's movement away from the game console may be determined by the change in the position of the LEDs 1-6 on the HMD surface. For example, as the LEDs 2, 4, 6 move away from the camera's 108 view other markers, such as LEDs 1, 3 and 5, come into the view of the camera 108. By tracking the LEDs disposed on the external surfaces of the HMD, it may be determined that the user has turned away from facing the camera to facing away from the camera and walking away toward a set of stairs, for example, while completely immersed in gameplay. The HMD data processing module may detect change in data related to the HMD, such as change in position, elevation, orientation, direction, location of the various LEDs on the HMD worn by the user. The changed data may be used to determine the position of the user and provide appropriate warning messages. For example, at time t0, no change in the position of the user wearing the HMD is detected and, as a result, interactive game scene from the video game continues to be rendered at the display portion of the HMD. At time t1, the HMD data processing module detects the user turning and walking away from the console and, in response to the user action, generates a warning signal that identifies a severity level of the environmental safety and sends appropriate data for rendering on the HMD. When the warning signal identifies a low severity level, a warning message that is descriptive of the severity level, is presented to augment the interactive game scene rendered on the HMD. At time t2, as the user continues to walk away toward the stairs, the HMD data processing module determines the severity of the environmental safety condition in the user's vicinity, and transmits images of the real-world objects from the user's immediate vicinity as well as appropriate warning message indicating high severity level, for rendering on the HMD. Due to the high severity level, the transmission of the images causes interruption to the interactive game scenes rendered on the HMD and rendition of the images of the real-world objects on the HMD. In addition, a warning message defining the severity of the environmental safety condition is also rendered.

The change in condition, (i.e., position, elevation, orientation, direction, location) of the HMD worn by the user is not restricted to tracking LEDs but may include tracking the movement and/or rotation of marker elements, such as lights, visual markers, infrared marker elements, etc., disposed on the different external surfaces of the HMD and the controller, using one or more image sensors, depth sensors and/or inertial sensors (i.e., one or more gyroscopes, one or more accelerometers) or any combinations thereof. When a change in the position of the HMD and/or the controller is detected that exceeds a pre-defined threshold value, the HMD data processing module may be pre-programmed to stop the video game, pause the game, interrupt the game play/interactive scenes rendered on the HMD, and render the data related to the environment in the vicinity of the user wearing the HMD.

It should be noted that the change in condition may be monitored by both the operating system code of the HMD that initiates a system specific action trigger and the game code that initiates a game specific action trigger. Accordingly, the warning message generated is in accordance to the system specific and game specific action triggers. Thus, the various codes/code modules involved in the execution of the video game, such as game code module, code from the HMD's operating system (OS), application code from the HMD, a combination of code from HMD/OS, firmware, software on a game console, code executed by the game console or application server, or code executing on a cloud server, etc., monitor the change in condition (i.e., orientation, position, location, direction, etc.) of the HMD and/or the controller worn/handled by the user to generate appropriate warning message and to transmit appropriate data that is used to warn the user and to adjust the content rendered on the HMD. The transmitted data can be used to adjust the content rendered on the HMD gradually to enable a user to fully immerse or slowly release from the video game to avoid disorienting the user. The warning message may be in the form of an audio signal, a sound signal, a textual signal, a graphical signal (animated or static), or any other form of signal that can be provided to the user warning the user of safety issues during use of the HMD/controller. If the warning signals are not sufficient to prevent the safety concern from occurring, the HMD may be automatically transitioned out of the interactive scene currently rendering on the HMD.

Figure 12:
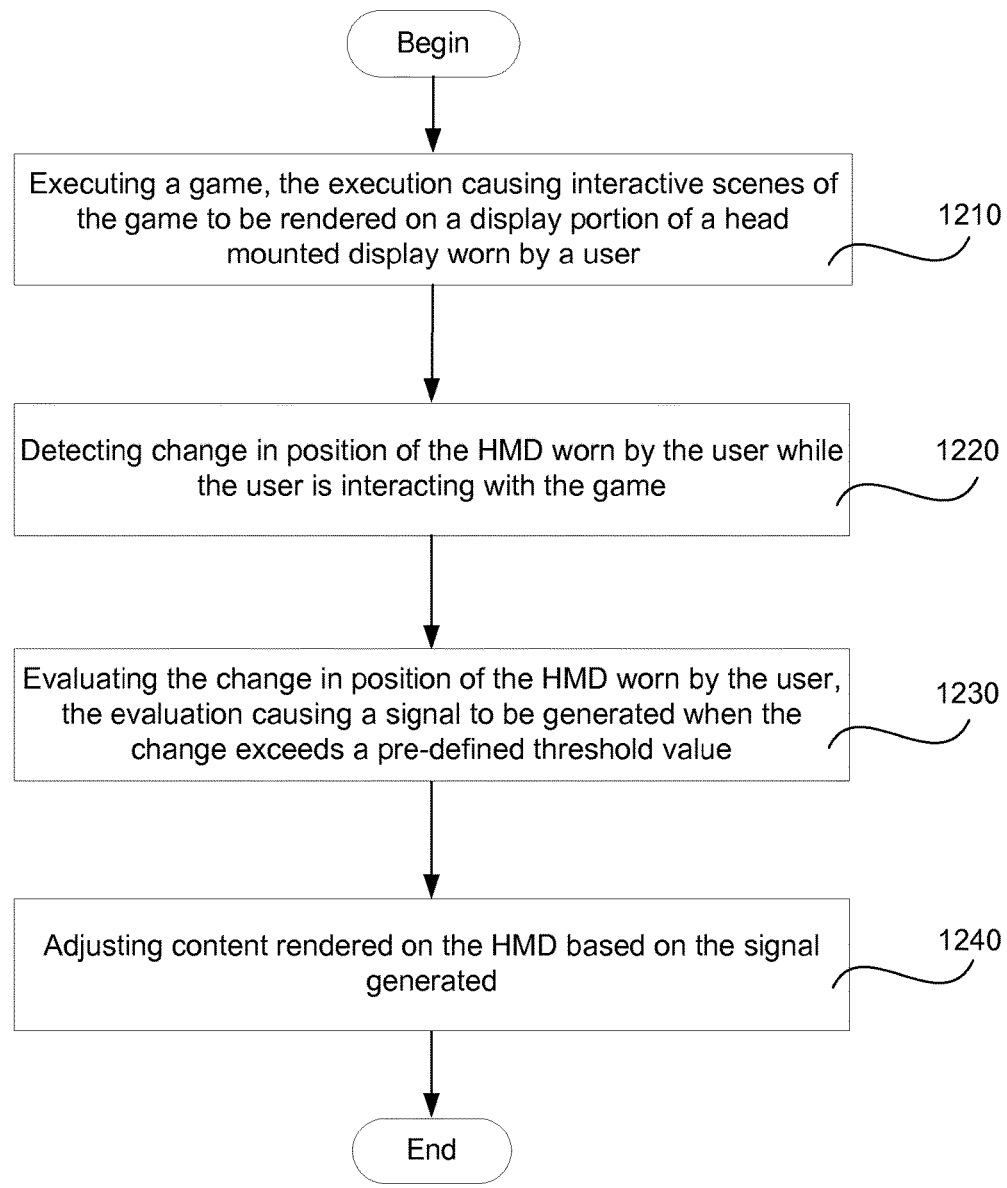
FIG. 12 is a process flow diagram showing a method for adjusting content rendered on a head mounted display, in accordance with an alternate embodiment of the invention.

With the detailed description of the various embodiments, a method for adjusting content and/or providing warning to a user will now be described with reference to FIG. 12. The method begins at operation 1210, wherein a game is executed. The game may be executed on a client device, on a game console, or on a game server in a game cloud. The execution of the game results in the interactive scenes of the game to be streamed to a head mounted display (HMD) worn by a user, for rendering. A change in the position of the HMD worn by the user is detected while the user is interacting with the game, as illustrated in operation 1220. The change in position may be detected by monitoring the location, orientation, direction of one or more markers distributed throughout various external surfaces of the HMD using any one or combination of image sensors, depth sensors or inertial sensors. Alternately, the change in position may be detected using data obtained from inertial sensors distributed within the HMD. When a change in a position of the HMD is detected, the change is evaluated, as illustrated in operation 1230. The evaluation of the change may be performed by code modules within the HMD, by game code module of a game executing on a client device that provides data for rendering the interactive scenes of the game at the HMD, by an operating system of the HMD, of the client device, or of a game cloud server. As described earlier, the evaluation of the change may include determining if the change in the position exceeds a pre-defined threshold value. If the change in position of the HMD exceeds the pre-defined threshold value, a signal is generated by the code module at the client device. Based on the signal generated at the client device, data is transmitted to the HMD to cause interruption and/or adjustment of the content rendered on the HMD, as illustrated in operation 1240. The adjustment to content may be to provide a warning message to a user wearing the HMD alongside the interactive game scene content, adjust content to fade in brightness, transition out of the content, render images of real-world objects/scenes from the vicinity of the user instead of the interactive game scenes, etc. The adjustment to the content can be graduated to allow the user to extricate from the video game or slowly immerse back into the video game, after having been interrupted, depending on the signal.

Thus, the technology for warning users of head mounted displays is disclosed. The various embodiments are able to detect elevation positions of the HMD and/or the controller in a plurality of ways, including height comparisons of the HMD (e.g., LEDs), controller LEDs, motions by the controller and/or LEDs. In some cases, some games, such as high intensity video games, may require that the user sit while playing the game. For such games, the system can monitor to determine when the user stands up while playing the game. Such monitoring can be enabled by monitoring the change in a variable, such as height, and issue appropriate warning or interruption to the interactive game scenes. The system can also determine when a cord of the HMD is being pulled too many times, too tight, or is wrapped around a user, for e.g., by detecting motion of the HMD using gyroscope, accelerometer, rotation of the LEDs of the HMD, or LEDs of the controller, or combinations of two or more thereof. Once such signal or condition is detected the system provides appropriate warnings and/or data to transition out of the game scenes. The condition is monitored by operating system code of the HMD, code of a particular game, software on a game console, code executed by the game console, code executing of the game, or code executing on a cloud server.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

Figure 13:
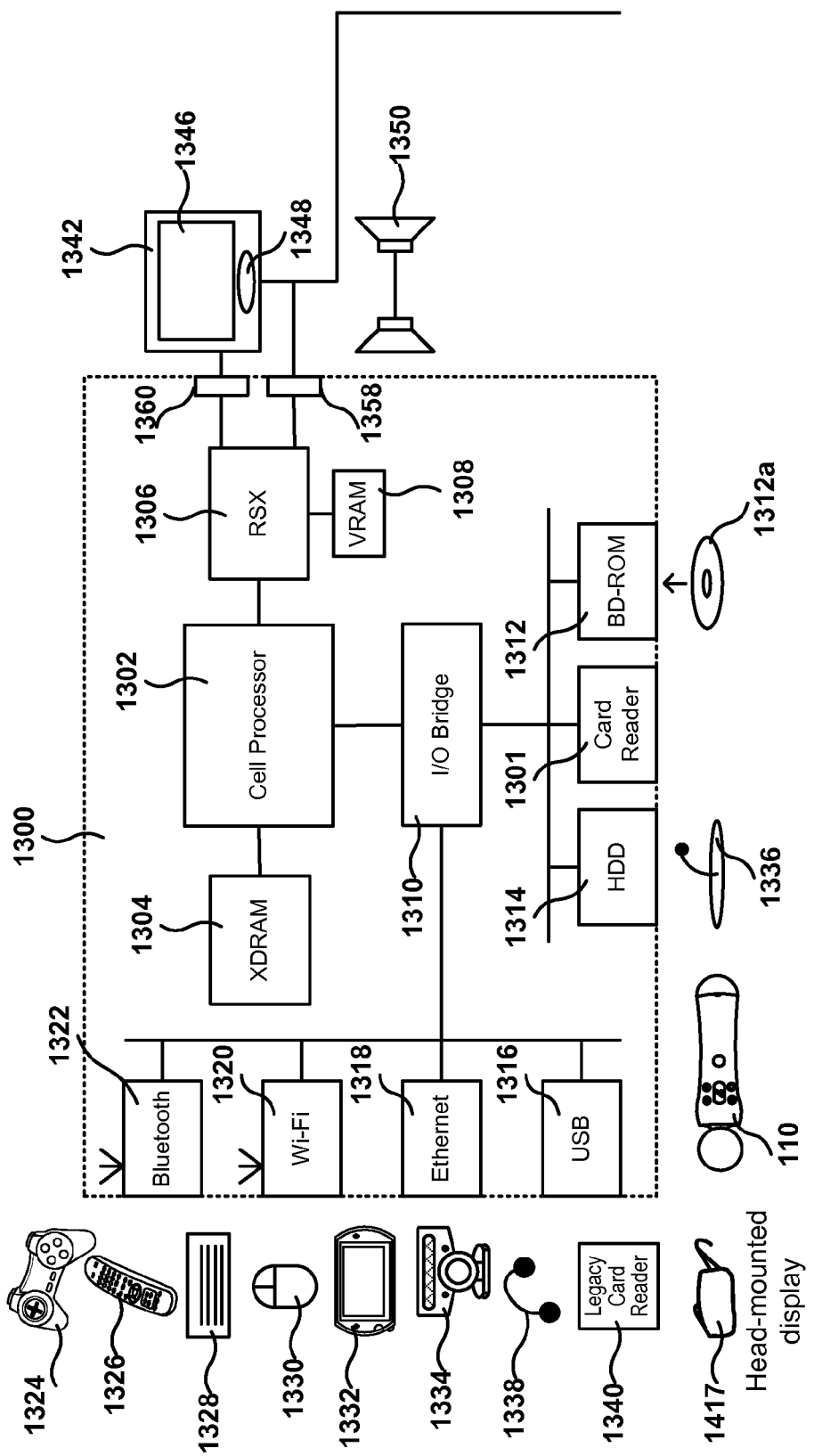
FIG. 13 illustrates overall system architecture of a game module, in one embodiment of the invention.

FIG. 13 illustrates hardware and user interfaces that may be used to implement some embodiments of the invention. FIG. 6 schematically illustrates the overall system architecture of the Sony® PlayStation 3® entertainment device. Other versions of PlayStation may include more or less features. A system unit 1300 is provided, with various peripheral devices connectable to the system unit 1300. The system unit 1300 includes: a Cell processor 1302; a Rambus® dynamic random access memory (XDRAM) unit 1304; a Reality Synthesizer graphics unit 1306 with a dedicated video random access memory (VRAM) unit 1308; and an I/O bridge 1310. The system unit 1300 also comprises a Blu Ray® Disk BD-ROM® optical disk reader 1312 for reading from a disk 1312a and a removable slot-in hard disk drive (HDD) 1314, accessible through the I/O bridge 1310. Optionally, the system unit 1300 also comprises a memory card reader 1301 for reading compact flash memory cards, Memory Stick® memory cards and the like, which is similarly accessible through the I/O bridge 1310.

The I/O bridge 1310 also connects to six Universal Serial Bus (USB) 2.0 ports 1316; a gigabit Ethernet port 1318; an IEEE 802.11b/g wireless network (Wi-Fi) port 1320; and a Bluetooth® wireless link port 1322 capable of supporting of up to seven Bluetooth connections.

In operation, the I/O bridge 1310 handles all wireless, USB and Ethernet data, including data from one or more game controllers 110 and 1324. For example, when a user is playing a game, the I/O bridge 1310 receives data from the game controller 110 and 1324 via a Bluetooth link and directs it to the Cell processor 1302, which updates the current state of the game accordingly.

The wireless, USB and Ethernet ports also provide connectivity for other peripheral devices in addition to game controllers 110 and 1324, such as: a remote control 1326; a keyboard 1328; a mouse 1330; a portable entertainment device 1332 such as a Sony PSP® entertainment device; a video camera such as a PlayStation® Eye Camera 1334; a shape object 1336; and a microphone 1338. Such peripheral devices may therefore in principle be connected to the system unit 1300 wirelessly; for example, the portable entertainment device 1332 may communicate via a Wi-Fi ad-hoc connection, while the shape object 1336 may communicate via a Bluetooth link.

The provision of these interfaces means that the PlayStation 3 device is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1340 may be connected to the system unit via a USB port 1316, enabling the reading of memory cards of the kind used by the PlayStation® or PlayStation 2® devices.

The game controllers 110 and 1324 are operable to communicate wirelessly with the system unit 1300 via the Bluetooth link, or to be connected to a USB port, thereby also providing power by which to charge the battery of the game controllers 110 and 1324. Game controllers 110 and 1324 can also include memory, a processor, a memory card reader, permanent memory such as flash memory, light emitters such as an illuminated spherical section, light emitting diodes (LEDs), or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 1324 is a controller designed to be used with two hands, and game controller 110 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1326 is also operable to communicate wirelessly with the system unit 1300 via a Bluetooth link. The remote control 1326 comprises controls suitable for the operation of the Blu Ray™ Disk BD-ROM reader 1312 and for the navigation of disk content.

The Blu Ray™ Disk BD-ROM reader 1312 is operable to read CD-ROMs compatible with the PlayStation and PlayStation 2 devices, in addition to conventional pre-recorded and recordable CDs, and so-called Super Audio CDs. The reader 1312 is also operable to read DVD-ROMs compatible with the Playstation 2 and PlayStation 3 devices, in addition to conventional pre-recorded and recordable DVDs. The reader 1312 is further operable to read BD-ROMs compatible with the PlayStation 3 device, as well as conventional pre-recorded and recordable Blu-Ray Disks.

The system unit 1300 is operable to supply audio and video, either generated or decoded by the PlayStation 3 device via the Reality Synthesizer graphics unit (RSX) 1306, through audio and video connectors to a display and sound output device 1342 such as a monitor or television set having a display 1346 and one or more loudspeakers 1348, or stand-alone speakers 1350. In one embodiment, voice and gaze inputs are utilized to play sound toward specific audio speakers according to the POG of the user. The audio connectors 1358 may include conventional analogue and digital outputs while the video connectors 1360 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1302. The PlayStation 3 device's operating system supports Dolby® 5.1 surround sound, Dolby® Theatre Surround (DTS), and the decoding of 7.1 surround sound from Blu-Ray® disks.

In the present embodiment, the video camera 1334 comprises a single Charge Coupled Device (CCD), an LED indicator, and hardware-based real-time data compression and encoding apparatus so that compressed video data may be transmitted in an appropriate format such as an intra-image based MPEG (motion picture expert group) standard for decoding by the system unit 1300. The camera LED indicator is arranged to illuminate in response to appropriate control data from the system unit 1300, for example to signify adverse lighting conditions. Embodiments of the video camera 1334 may variously connect to the system unit 1300 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may, for example, be incorporated within a game or interpreted as game control inputs. In another embodiment, the camera is an infrared camera suitable for detecting infrared light.

In general, in order for successful data communication to occur with a peripheral device such as a video camera or remote control via one of the communication ports of the system unit 1300, an appropriate piece of software such as a device driver should be provided. Device driver technology is well-known and will not be described in detail here, except to say that the skilled man will be aware that a device driver or similar software interface may be required in the present embodiment described.

Figure 14:
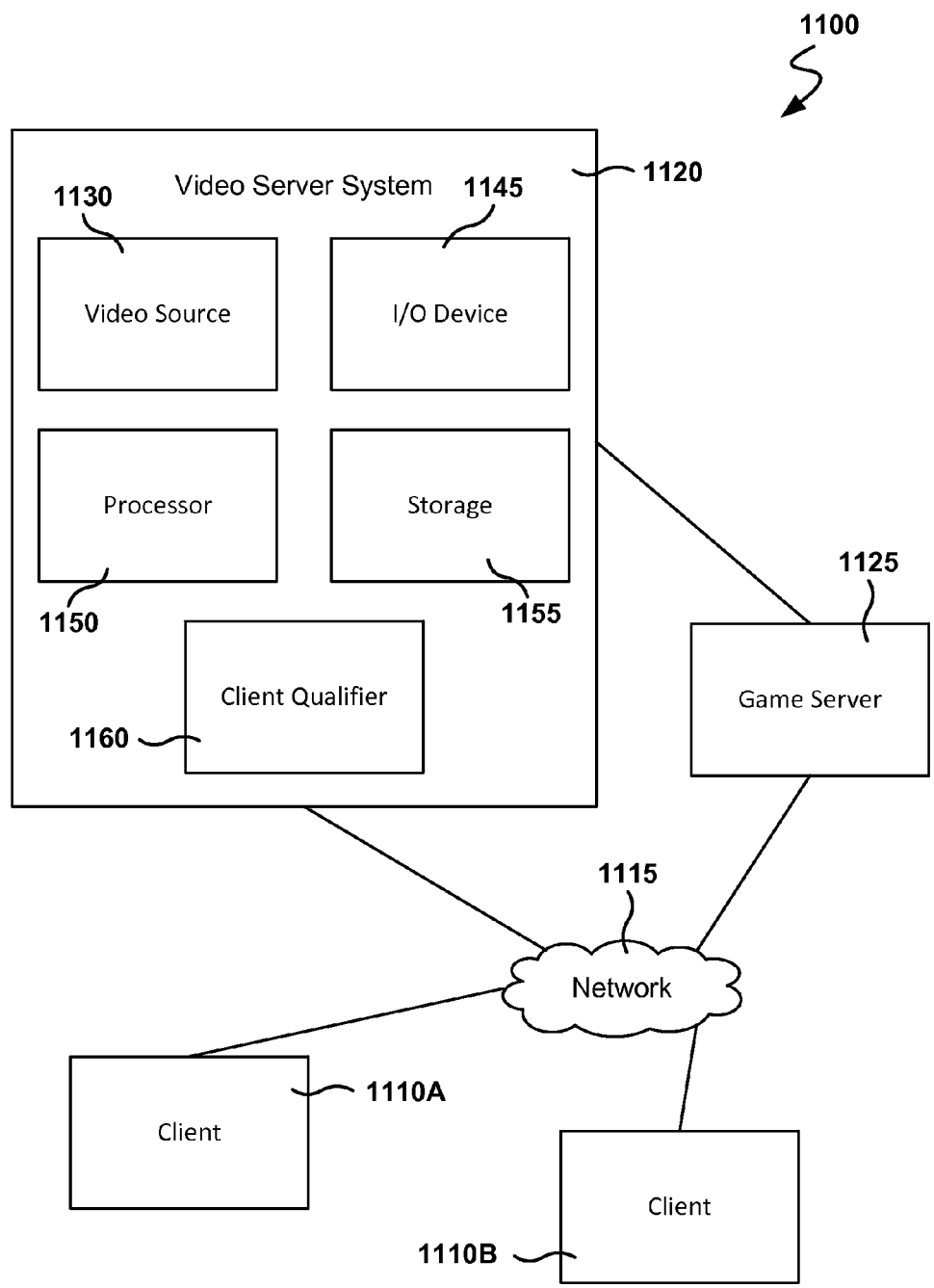
FIG. 14 illustrates a block diagram of a game system, in accordance with an embodiment of the invention.

FIG. 14 is a block diagram of a Game System 1100, according to various embodiments of the invention. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1120 frames per second. Although higher or lower frame rates are included in alternative embodiments of the invention.

Clients 1110, referred to herein individually as 1110A, 1110B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1110 or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1120 to deliver a game viewed through the HMD. In one embodiment, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some embodiments, a member of Clients 1110 is configured to perform further rendering, shading, conversion to 3-D, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect game play. The game commands can be received using input devices and/or may be automatically generated by computing instructions executing on Clients 1110. The received game commands are communicated from Clients 1110 via Network 1115 to Video Server System 1120 and/or Game Server 1125. For example, in some embodiments, the game commands are communicated to Game Server 1125 via Video Server System 1120. In some embodiments, separate copies of the game commands are communicated from Clients 1110 to Game Server 1125 and Video Server System 1120. The communication of game commands is optionally dependent on the identity of the command. Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multiplayer game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some embodiments, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example, Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some embodiments, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1130 includes a video recording device such as a camera. This camera may be used to generate delayed or live video that can be included in the video stream of a computer game. The resulting video stream, optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In embodiments of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In embodiments wherein Video Server System 1120 is configured to maintain the game state based on input from more than one player, each player may have a different point of view comprising a position and direction of view. Video Source 1130 is optionally configured to provide a separate video stream for each player based on their point of view. Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125, Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g. a hard drive, an optical drive, or solid state storage. Storage 1115 is configured (e.g. by way of an appropriate data structure or file system) to store video frames, artificial frames, a video stream including both video frames and artificial frames, audio frame, an audio stream, and/or the like. Storage 1155 is optionally distributed among a plurality of devices. In some embodiments, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some embodiments, Client Qualifier 1160 is configured to display images, text, and/or the like within a browser of Client 1110A. In one embodiment, Client 1110A is an HMD that includes a browser. In another embodiment, client 1110A is a game console having a browser, which may be displayed on the HMD. The displayed objects request that the user enter information such as operating system, processor, video decoder type, type of network connection, display resolution, etc. of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various embodiments, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some embodiments, Client Qualifier 1160 is configured to determine the characteristics of communication channels between Clients 1110 and more than one instance of Video Server System 1120. In these embodiments the information discovered by Client Qualifier can be used to determine which instance of Video Server System 1120 is best suited for delivery of streaming video to one of Clients 1110.

Embodiments of the present invention may be practiced with various computer system configurations including hand-held devices, microprocessor systems, microprocessor-based or programmable consumer electronics, minicomputers, mainframe computers and the like. Several embodiments of the present invention can also be practiced in distributed computing environments where tasks are performed by remote processing devices that are linked through a wire-based or wireless network.

With the above embodiments in mind, it should be understood that a number of embodiments of the present invention can employ various computer-implemented operations involving data stored in computer systems. These operations are those requiring physical manipulation of physical quantities. Any of the operations described herein that form part of various embodiments of the present invention are useful machine operations. Several embodiments of the present invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Various embodiments of the present invention can also be embodied as computer readable code on a computer readable medium. The computer readable medium is any data storage device that can store data, which can be thereafter be read by a computer system. Examples of the computer readable medium include hard drives, network attached storage (NAS), read-only memory (ROM), random-access memory, compact disc-ROMs (CD-ROMs), CD-recordables (CD-Rs), CD-rewritables (RWs), magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the various embodiments of the present invention is not to be limited to the details given herein, but may be modified within the scope and equivalents of the appended claims.

What is claimed is:

1. A method, comprising:
   executing a game, the execution causing interactive scenes of the game to be rendered on a display portion of a head mounted display (HMD) worn by a user, the HMD when worn by the user is configured to block a view to a real-world environment;
   determining coordinates of the HMD in a three-dimensional space of the real-world environment, the coordinates used to identify a current position of the user wearing the HMD;
   monitoring a movement of the HMD during execution of the game, the movement of the HMD determined by identifying a change in one or more coordinates of the HMD in the three-dimensional space;
   evaluating the change in the one or more coordinates of the HMD worn by the user to determine when the user is approaching a physical object present in the real-world environment;
   blending in an image of the physical object with the interactive scenes when the evaluating determines that the user continues to approach the physical object; and
   fading out the image of the physical object when the evaluating determines that the user is moving away from the physical object,
   wherein the method operations are performed by a processor.

2. The method of claim 1, further comprising,
   determining a position of the physical object in the real-world environment using a depth sensing device that collects data usable to map depth information of the real-world environment.

3. The method of claim 2, wherein the depth sensing device is one of a depth sensor, or an image sensor, or a stereo three-dimensional camera, or an infrared camera, or an ultraviolet camera, or a video camera, or a radar device, or a laser radar device, or a depth camera, or combinations of any two or more thereof.

4. The method of claim 1, further comprising,
   performing a calibration operation to identify locations of the physical object and other physical objects in the real-world environment; and
   using the locations of the physical object or other physical objects in the real-world environment and the change in the one or more coordinates of the HMD to assist in determining when the user is approaching or moving away from the physical object.

5. The method of claim 1, further comprising,
   providing a warning on the display portion of the HMD that includes instructions on how the user is to move away from the physical object.

6. The method of claim 1, wherein blending further includes increasing a brightness of the image of the physical object as the user approaches closer to the physical object.

7. A method, comprising:
   executing an interactive application, the execution causing interactive content of the interactive application to be rendered on a display portion of a head mounted display (HMD) worn by a user, the HMD when worn by the user is configured to block a view to a real-world environment;
   determining coordinates of the HMD in a three-dimensional space of the real-world environment, the coordinates used to identify a current position of the user wearing the HMD;
   monitoring a movement of the HMD during execution of the interactive application, the movement of the HMD determined by identifying a change in one or more coordinates of the HMD in the three-dimensional space;

evaluating the change in the one or more coordinates of the HMD worn by the user to determine when the user is approaching a physical object present in the real-world environment;

blending in an image of the physical object with the interactive content when the evaluating determines that the user continues to approach the physical object; and fading out the image of the physical object when the evaluating determines that the user is moving away from the physical object, wherein the method operations are performed by a processor.

8. The method of claim 7, further comprising, performing a calibration operation to identify locations of the physical object and other physical objects in the real-world environment; and using the locations of the physical object or other physical objects in the real-world environment and the change in the one or more coordinates of the HMD to assist in determining when the user is approaching or moving away from the physical object.

\* \* \* \* \*